(12) United States Patent
Yu

(10) Patent No.: US 10,411,863 B2
(45) Date of Patent: Sep. 10, 2019

(54) UPLINK DATA TRANSMISSION METHOD AND APPARATUS

(71) Applicant: Huawei Technologies Co., Ltd., Shenzhen (CN)

(72) Inventor: Rongdao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 15/858,846

(22) Filed: Dec. 29, 2017

(65) Prior Publication Data

US 2018/0123763 A1 May 3, 2018

Related U.S. Application Data

(63) Continuation of application No. PCT/CN2015/082718, filed on Jun. 30, 2015.

(51) Int. Cl.
*H04L 5/00* (2006.01)
*H04W 72/04* (2009.01)
(Continued)

(52) U.S. Cl.
CPC .......... *H04L 5/0053* (2013.01); *H04L 1/0061* (2013.01); *H04L 1/0077* (2013.01);
(Continued)

(58) Field of Classification Search
CPC ... H04L 5/0053; H04L 1/0077; H04L 1/1893; H04L 1/0061; H04W 72/085; H04W 72/04

See application file for complete search history.

(56) References Cited

U.S. PATENT DOCUMENTS

2013/0100911 A1* 4/2013 Lv .................. H04L 1/0026
370/329
2013/0308612 A1* 11/2013 Cai .................. H04L 1/0028
370/336
(Continued)

FOREIGN PATENT DOCUMENTS

CN 102769913 A 11/2012
CN 103716273 A 4/2014
(Continued)

OTHER PUBLICATIONS

Guo, B. et al., "Outage Performance of DF Network Coded (DFNC) Mulit-User Cooperative Diversity in Orthogonal Uplink Channels," XP031846217, IEEE Communications Society, IEEE Globecom 2010 proceedings, Dec. 6, 2010, 6 pages.
(Continued)

*Primary Examiner* — Min Jung
(74) *Attorney, Agent, or Firm* — Slater Matsil, LLP

(57) ABSTRACT

A method includes obtaining, by a first terminal device, second uplink data of a second terminal device, performing, by the first terminal device, joint coding processing on first uplink data of the first terminal device and on the second uplink data, where the performing the joint coding processing generates jointly coded data that is based on the first uplink data and the second uplink data, and transmitting, by the first terminal device, the first uplink data and the jointly coded data to a network device, where the first uplink data is transmitted to the network device separately from the jointly coded data. The first uplink data may be transmitted on a first transmission resource, and the jointly coded data to the network device may be transmitted on a second transmission resource different from the first transmission resource.

21 Claims, 9 Drawing Sheets

(51) Int. Cl.
*H04L 1/00* (2006.01)
*H04L 1/18* (2006.01)
*H04W 72/08* (2009.01)
*H04J 13/18* (2011.01)
*H04W 74/00* (2009.01)

(52) U.S. Cl.
CPC ........... *H04L 1/1893* (2013.01); *H04W 72/04* (2013.01); *H04W 72/085* (2013.01); *H04J 13/18* (2013.01); *H04W 74/004* (2013.01)

(56) References Cited

U.S. PATENT DOCUMENTS

| | | | | |
|---|---|---|---|---|
| 2014/0010188 | A1* | 1/2014 | Li | H04L 1/0073 370/329 |
| 2014/0086184 | A1* | 3/2014 | Guan | H04W 72/1289 370/329 |
| 2014/0254544 | A1 | 9/2014 | Kar Kin Au et al. | |
| 2014/0274183 | A1 | 9/2014 | Zhu et al. | |
| 2015/0049698 | A1* | 2/2015 | Liu | H04L 5/0057 370/329 |
| 2015/0201406 | A1 | 7/2015 | Zhang | |
| 2016/0006493 | A1* | 1/2016 | Chen | H04B 7/0456 375/267 |
| 2016/0094327 | A1 | 3/2016 | Han et al. | |
| 2018/0103457 | A1* | 4/2018 | Yuan | H04L 1/243 |
| 2018/0124816 | A1* | 5/2018 | Han | H04W 72/04 |
| 2018/0310298 | A1* | 10/2018 | Li | H04L 1/1671 |

FOREIGN PATENT DOCUMENTS

| | | |
|---|---|---|
| CN | 103973397 A | 8/2014 |
| CN | 104104485 A | 10/2014 |
| WO | 2014135126 A1 | 9/2014 |

OTHER PUBLICATIONS

Kandhway, K. et al., "Cooperative Communication in Wireless Uplink Transmissions using Random Network Coding," Vehicular Technology Conference Fall, (VTC 2010-Fall) 2010 IEEE 72nd, Sep. 6, 2010, 6 pages.

Osseiran, A. et al., "Advances in Device-to-Device Communications and Network Coding for IMT-Advanced," XP008164545, ICT-Mobile Summit 2009 Conference Proceedings, IIMC International Information Management, Jun. 1, 2009, 8 pages.

* cited by examiner

UPLINK DATA TRANSMISSION METHOD AND APPARATUS

CROSS-REFERENCE TO RELATED APPLICATIONS

This application is a continuation of International Application No. PCT/CN2015/082718, filed on Jun. 30, 2015, which is hereby incorporated by reference in its entirety.

TECHNICAL FIELD

The present invention relates to the communications field, and more specifically, to an uplink data transmission method and apparatus.

BACKGROUND

In the prior art, to improve transmission reliability, a hybrid automatic repeat request (HARQ) technology is used for data transmission, that is, a receive end needs to feed back, to a transmit end, indication information used to indicate whether data transmitted by the transmit end is successfully received. Specifically, if reception fails, the receive end feeds back a negative-acknowledgment (NACK) message to the transmit end. Correspondingly, after receiving the NACK message, the transmit end may retransmit data according to a specified HARQ time sequence relationship. In this case, because both a feedback of the receive end and retransmission of the transmit end cause a transmission delay, there is a relatively great transmission delay for data transmission performed using the HARQ technology. A future communications system, for example, a system using uplink grant-free (Grant Free) transmission, usually requires relatively low signaling overheads and a relatively short transmission delay. However, the HARQ technology does not meet a transmission delay requirement of the future communications system.

SUMMARY

Embodiments of the present invention provide an uplink data transmission method and apparatus. This can reduce a transmission delay while transmit diversity gains are obtained.

According to a first aspect, an embodiment of the present invention provides an uplink data transmission method, including obtaining, by a first terminal device, second uplink data of a second terminal device, performing, by the first terminal device, joint coding processing on first uplink data of the first terminal device and the second uplink data to obtain jointly coded data, and transmitting, by the first terminal device, the first uplink data to a network device using a first transmission resource, and transmitting the jointly coded data to the network device using a second transmission resource different from the first transmission resource.

In a first possible implementation of the first aspect, before the obtaining second uplink data of a second terminal device, the method further includes receiving first instruction information transmitted by the network device, where the first instruction information is used to instruct the first terminal device and the second terminal device to perform transmit diversity transmission, and determining, according to the first instruction information, to perform transmit diversity transmission with the second terminal device.

With reference to any one of the first aspect or the first implementation of the first aspect, in a second possible implementation of the first aspect, the first instruction information includes group identifier information of a terminal device group to which the second terminal device belongs and number information of the second terminal device in the terminal device group.

With reference to any one of the first aspect or the foregoing possible implementations of the first aspect, in a third possible implementation of the first aspect, before the obtaining second uplink data of a second terminal device, the method further includes transmitting a transmit diversity transmission request to at least one terminal device including the second terminal device, where the transmit diversity transmission request is used to request to perform transmit diversity transmission with the first terminal device, receiving a transmit diversity transmission response transmitted by the second terminal device according to the transmit diversity transmission request, and determining, according to the received transmit diversity transmission response, to perform transmit diversity transmission with the second terminal device.

With reference to any one of the first aspect or the foregoing possible implementations of the first aspect, in a fourth possible implementation of the first aspect, the method further includes: transmitting second instruction information to the network device, where the second instruction information is used to instruct the first terminal device and the second terminal device to perform transmit diversity transmission.

With reference to any one of the first aspect or the foregoing possible implementations of the first aspect, in a fifth possible implementation of the first aspect, before the transmitting the first uplink data to a network device using a first transmission resource, the method further includes adding a cyclic redundancy check (CRC) code to the first uplink data, where the CRC code is scrambled using an identifier of the second terminal device, and where the transmitting the first uplink data to a network device using a first transmission resource includes transmitting, to the network device using the first transmission resource, the first uplink data to which the CRC code is added.

With reference to any one of the first aspect or the foregoing possible implementations of the first aspect, in a sixth possible implementation of the first aspect, the obtaining second uplink data of a second terminal device includes: receiving, by means of device-to-device (D2D) transmission, the second uplink data transmitted by the second terminal device.

With reference to any one of the first aspect or the foregoing possible implementations of the first aspect, in a seventh possible implementation of the first aspect, the first transmission resource is specifically a first contention transmission unit (CTU), the second transmission resource is specifically a second CTU, and the first CTU and the second CTU are located in different contention access regions.

With reference to any one of the first aspect or the foregoing possible implementations of the first aspect, in an eighth possible implementation of the first aspect, before the transmitting the jointly coded data to the network device using a second transmission resource different from the first transmission resource, the method further includes obtaining information about a third transmission resource used by the second terminal device to transmit the second uplink data, and determining, according to the information about the third transmission resource and the first transmission resource, the second transmission resource used to transmit the jointly coded data.

With reference to any one of the first aspect or the foregoing possible implementations of the first aspect, in a ninth possible implementation of the first aspect, if the second transmission resource is specifically the second CTU, an index number $\text{Indx}_{CTU}$ of the second CTU is determined using the following formula:

$$\text{Indx}_{CTU}=(\text{Sig}_1+\text{Sig}_2)\bmod N_{CTU},$$

where $\text{Sig}_1$ is an index of a code resource included in the first transmission resource, $\text{Sig}_2$ is an index of a code resource included in the third transmission resource, and $N_{CTU}$ is a quantity of CTUs included in a current subframe.

With reference to any one of the first aspect or the foregoing possible implementations of the first aspect, in a tenth possible implementation of the first aspect, the code resource comprised in the first or the third transmission resource includes one of the following: a sparse code multiple access codebook, a low density signature sequence, or a Code Division Multiple Access code.

With reference to any one of the first aspect or the foregoing possible implementations of the first aspect, in an eleventh possible implementation of the first aspect, the first uplink data and the jointly coded data are transmitted by the first terminal device to the network device in a grant-free transmission manner.

According to a second aspect, another uplink data transmission method is provided, including determining, by a second terminal device, to-be-transmitted uplink data and a transmission resource for the uplink data, transmitting, by the second terminal device, the uplink data and information about the transmission resource to a first terminal device, and transmitting, by the second terminal device, the uplink data to a network device using the transmission resource.

In a first possible implementation of the second aspect, before the transmitting the uplink data and information about the transmission resource to the first terminal device, the method further includes: receiving first instruction information transmitted by the network device, where the first instruction information is used to instruct the first terminal device and the second terminal device to perform transmit diversity transmission, and determining, according to the first instruction information, to perform transmit diversity transmission with the first terminal device.

With reference to any one of the second aspect or the first implementation of the second aspect, in a second possible implementation of the second aspect, the first instruction information includes group identifier information of a terminal device group to which the first terminal device belongs and number information of the first terminal device in the terminal device group.

With reference to any one of the second aspect or the foregoing possible implementations of the second aspect, in a third possible implementation of the second aspect, before the transmitting the uplink data and information about the transmission resource to the first terminal device, the method further includes receiving a transmit diversity transmission request transmitted by the first terminal device, where the transmit diversity transmission request is used to request to perform transmit diversity transmission with the first terminal device; and determining, according to the transmit diversity transmission request, to perform transmit diversity transmission with the first terminal device, and the method further includes transmitting a transmit diversity transmission response to the first terminal device.

With reference to any one of the second aspect or the foregoing possible implementations of the second aspect, in a fourth possible implementation of the second aspect, before the transmitting the uplink data to a network device using the transmission resource, the method further includes adding a CRC code to the uplink data, where the CRC code is scrambled using an identifier of the first terminal device; and the transmitting the uplink data to a network device using the transmission resource corresponding to the information about the transmission resource includes: transmitting, to the network device using the transmission resource corresponding to the information about the transmission resource, the uplink data to which the CRC code is added.

With reference to any one of the second aspect or the foregoing possible implementations of the second aspect, in a fifth possible implementation of the second aspect, the transmitting the uplink data and information about the transmission resource to the first terminal device includes: transmitting the uplink data and the information about the transmission resource to the first terminal device by means of D2D transmission.

With reference to any one of the second aspect or the foregoing possible implementations of the second aspect, in a sixth possible implementation of the second aspect, the information about the transmission resource includes information about a code resource, and the code resource includes one of the following a sparse code multiple access codebook, a low density signature sequence, or a Code Division Multiple Access code.

With reference to any one of the second aspect or the foregoing possible implementations of the second aspect, in a seventh possible implementation of the second aspect, the uplink data is transmitted by the second terminal device to the network device in a grant-free transmission manner.

According to a third aspect, another uplink data transmission method is provided, including: receiving, by a network device, first uplink data transmitted by a first terminal device using a first transmission resource, and second uplink data transmitted by a second terminal device using a third transmission resource, obtaining jointly coded data transmitted by the first terminal device using a second transmission resource different from the first transmission resource, where the jointly coded data is obtained by performing joint coding processing on the first uplink data and the second uplink data, and obtaining, according to the jointly coded data obtained, the first uplink data, and the second uplink data, a decoding result of the first uplink data and a decoding result of the second uplink data.

In a first possible implementation of the third aspect, before the receiving first uplink data transmitted by a first terminal device using a first transmission resource, and second uplink data transmitted by a second terminal device using a third transmission resource, the method further includes determining that the first terminal device and the second terminal device perform transmit diversity transmission, and transmitting first instruction information to at least one terminal device of the first terminal device or the second terminal device, where the first instruction information is used to instruct the first terminal device and the second terminal device to perform transmit diversity transmission.

With reference to any one of the third aspect or the first implementation of the third aspect, in a second possible implementation of the third aspect, the determining that the first terminal device and the second terminal device perform transmit diversity transmission includes: determining, according to transmission reliability information of the first terminal device and transmission reliability information of the second terminal device, that the first terminal device and the second terminal device perform transmit diversity transmission, where the transmission reliability information includes at least one piece of the following information: transmit diversity transmission capability information, quality information of a current uplink channel, or historical bit error rate information.

With reference to any one of the third aspect or the foregoing possible implementations of the third aspect, in a third possible implementation of the third aspect, before the receiving first uplink data transmitted by a first terminal device using a first transmission resource, and second uplink data transmitted by a second terminal device using a third transmission resource, the method further includes receiving second instruction information transmitted by at least one terminal device of the first terminal device or the second terminal device, where the second instruction information is used to instruct the first terminal device and the second terminal device to perform transmit diversity transmission.

With reference to any one of the third aspect or the foregoing possible implementations of the third aspect, in a fourth possible implementation of the third aspect, before the obtaining jointly coded data transmitted by the first terminal device using a second transmission resource different from the first transmission resource, the method further includes: determining whether a determining condition for transmit diversity transmission is satisfied, where the determining condition for transmit diversity transmission includes at least one of the following: a CRC code corresponding to the first uplink data is scrambled using an identifier of the second terminal device, or a CRC code corresponding to the second uplink data is scrambled using an identifier of the first terminal device; and determining, when the determining condition for transmit diversity transmission is satisfied, that the first uplink data and the second uplink data are transmitted in a transmit diversity transmission manner.

With reference to any one of the third aspect or the foregoing possible implementations of the third aspect, in a fifth possible implementation of the third aspect, the first transmission resource is specifically a first CTU, the second transmission resource is a specifically a second CTU, the third transmission resource is specifically a third CTU that is different from the first CTU and the second CTU, and the third CTU is located in a contention access region different from that of the first CTU and that of the second CTU.

With reference to any one of the third aspect or the foregoing possible implementations of the third aspect, in a sixth possible implementation of the third aspect, the obtaining, according to the jointly coded data obtained, the first uplink data, and the second uplink data, a decoding result of the first uplink data and a decoding result of the second uplink data includes: performing demodulation processing on the received first uplink data to obtain an initial log-likelihood ratio corresponding to the first uplink data, performing demodulation processing on the received second uplink data to obtain an initial log-likelihood ratio corresponding to the second uplink data, performing demodulation processing on the jointly coded data obtained to obtain a log-likelihood ratio corresponding to the jointly coded data, determining, according to the log-likelihood ratio corresponding to the jointly coded data, the initial log-likelihood ratio corresponding to the first uplink data, and the initial log-likelihood ratio corresponding to the second uplink data, a final log-likelihood ratio corresponding to the first uplink data and a final log-likelihood ratio corresponding to the second uplink data, and performing decoding processing on the final log-likelihood ratio corresponding to the first uplink data, to obtain the decoding result of the first uplink data, and performing decoding processing on the final log-likelihood ratio corresponding to the second uplink data, to obtain the decoding result of the second uplink data.

With reference to any one of the third aspect or the foregoing possible implementations of the third aspect, in a seventh possible implementation of the third aspect, the determining, according to the log-likelihood ratio corresponding to the jointly coded data, the initial log-likelihood ratio corresponding to the first uplink data, and the initial log-likelihood ratio corresponding to the second uplink data, a final log-likelihood ratio corresponding to the first uplink data and a final log-likelihood ratio corresponding to the second uplink data includes: determining, according to the log-likelihood ratio corresponding to the jointly coded data, the initial log-likelihood ratio corresponding to the first uplink data, and the initial log-likelihood ratio corresponding to the second uplink data, prior probability information of the first uplink data and prior probability information of the second uplink data, determining, according to the prior probability information of the first uplink data and the initial log-likelihood ratio corresponding to the first uplink data, the final log-likelihood ratio corresponding to the first uplink data, and determining, according to the prior probability information of the second uplink data and the initial log-likelihood ratio corresponding to the second uplink data, the final log-likelihood ratio corresponding to the second uplink data.

With reference to any one of the third aspect or the foregoing possible implementations of the third aspect, in an eighth possible implementation of the third aspect, the obtaining jointly coded data transmitted by the first terminal device using a second transmission resource different from the first transmission resource includes: obtaining information about the first transmission resource and information about the third transmission resource; determining the second transmission resource according to the information about the first transmission resource and the information about the third transmission resource, and obtaining the jointly coded data transmitted using the second transmission resource.

With reference to any one of the third aspect or the foregoing possible implementations of the third aspect, in a ninth possible implementation of the third aspect, if the second transmission resource is specifically the second CTU, an index $\text{Indx}_{CTU'}$ of the second CTU is determined using the following formula:

$$\text{Indx}_{CTU'} = (\text{Sig}_1 + \text{Sig}_2) \bmod N_{CTU},$$

where $\text{Sig}_1$ is an index of a code resource included in the first transmission resource, $\text{Sig}_2$ is an index of a code resource included in the third transmission resource, and $N_{CTU'}$ is a quantity of CTUs included in a current subframe.

With reference to any one of the third aspect or the foregoing possible implementations of the third aspect, in a tenth possible implementation of the third aspect, the code resource comprised in the first or the third transmission resource includes one of the following: a sparse code multiple access codebook, a low density signature group, or a Code Division Multiple Access code group.

With reference to any one of the third aspect or the foregoing possible implementations of the third aspect, in an eleventh possible implementation of the third aspect, the receiving first uplink data transmitted by a first terminal device using a first transmission resource, and second uplink data transmitted by a second terminal device using a third transmission resource includes: receiving the first uplink data and the second uplink data that are transmitted in a grant-free transmission manner by the first terminal device and the second terminal device respectively.

According to a fourth aspect, another uplink data transmission method is provided, including: determining, by a network device, that a first terminal device performs transmit diversity transmission with a second terminal device, and transmitting first instruction information to at least one terminal device of the first terminal device or the second terminal device, where the first instruction information is used to instruct the first terminal device and the second terminal device to perform transmit diversity transmission.

In a first possible implementation of the fourth aspect, the determining that a first terminal device performs transmit diversity transmission with a second terminal device includes: determining, according to transmission reliability information of the first terminal device and transmission reliability information of the second terminal device, that the first terminal device and the second terminal device perform transmit diversity transmission, where the transmission reliability information includes at least one piece of the following information: transmit diversity transmission capability information, quality information of a current uplink channel, or historical bit error rate information.

According to a fifth aspect, an uplink data transmission apparatus is provided, including: an obtaining unit, configured to obtain second uplink data of a second terminal device; a coding unit, configured to perform joint coding processing on first uplink data of a first terminal device and the second uplink data obtained by the obtaining unit, to obtain jointly coded data; and a transmitting unit, configured to transmit the first uplink data to a network device using a first transmission resource, and transmit, to the network device using a second transmission resource different from the first transmission resource, the jointly coded data obtained by the coding unit.

In a first possible implementation of the fifth aspect, the apparatus further includes a first receiving unit, configured to, before the obtaining unit obtains the second uplink data of the second terminal device, receive first instruction information transmitted by the network device, where the first instruction information is used to instruct the first terminal device and the second terminal device to perform transmit diversity transmission; and a first determining unit, configured to determine, according to the first instruction information received by the first receiving unit, to perform transmit diversity transmission with the second terminal device.

With reference to any one of the fifth aspect or the first implementation of the fifth aspect, in a second possible implementation of the fifth aspect, the first instruction information includes group identifier information of a terminal device group to which the second terminal device belongs and number information of the second terminal device in the terminal device group.

With reference to any one of the fifth aspect or the foregoing possible implementations of the fifth aspect, in a third possible implementation of the fifth aspect, the transmitting unit is further configured to: before the obtaining unit obtains the second uplink data of the second terminal device, transmit a transmit diversity transmission request to at least one terminal device including the second terminal device, where the transmit diversity transmission request is used to request to perform transmit diversity transmission with the first terminal device, and the apparatus further includes: a second receiving unit, configured to receive a transmit diversity transmission response transmitted by the second terminal device according to the transmit diversity transmission request transmitted by the transmitting unit; and a second determining unit, configured to determine, according to the transmit diversity transmission response received by the second receiving unit, to perform transmit diversity transmission with the second terminal device.

With reference to any one of the fifth aspect or the foregoing possible implementations of the fifth aspect, in a fourth possible implementation of the fifth aspect, the transmitting unit is further configured to transmit second instruction information to the network device, where the second instruction information is used to instruct the first terminal device and the second terminal device to perform transmit diversity transmission.

With reference to any one of the fifth aspect or the foregoing possible implementations of the fifth aspect, in a fifth possible implementation of the fifth aspect, the apparatus further includes a check code addition unit, configured to: before the transmitting unit transmits the first uplink data to the network device using the first transmission resource, add a CRC code to the first uplink data, where the CRC code is scrambled using an identifier of the second terminal device; and the transmitting unit is specifically configured to transmit, to the network device using the first transmission resource, the first uplink data to which the CRC code is added by the check code addition unit.

With reference to any one of the fifth aspect or the foregoing possible implementations of the fifth aspect, in a sixth possible implementation of the fifth aspect, the obtaining unit is specifically configured to: receive, by means of D2D transmission, the second uplink data transmitted by the second terminal device.

With reference to any one of the fifth aspect or the foregoing possible implementations of the fifth aspect, in a seventh possible implementation of the fifth aspect, the first transmission resource is specifically a first CTU, the second transmission resource is specifically a second CTU, and the first CTU and the second CTU are located in different contention access regions.

With reference to any one of the fifth aspect or the foregoing possible implementations of the fifth aspect, in an eighth possible implementation of the fifth aspect, the obtaining unit is further configured to: before the transmitting unit transmits the jointly coded data to the network device using the second transmission resource different from the first transmission resource, obtain information about a third transmission resource used by the second terminal device to transmit the second uplink data, and the apparatus further includes a third determining unit, configured to determine, according to the first transmission resource and the information about the third transmission resource obtained by the obtaining unit, the second transmission resource used to transmit the jointly coded data, where the transmitting unit is specifically configured to transmit the jointly coded data using the second transmission resource determined by the third determining unit.

With reference to any one of the fifth aspect or the foregoing possible implementations of the fifth aspect, in a ninth possible implementation of the fifth aspect, if the second transmission resource is specifically the second CTU, an index number $\text{Indx}_{CTU}$ of the second CTU is determined using the following formula:

$$\text{Indx}_{CTU} = (\text{Sig}_1 + \text{Sig}_2) \bmod N_{CTU},$$

where $\text{Sig}_1$ is an index of a code resource included in the first transmission resource, $\text{Sig}_2$ is an index of a code resource included in the third transmission resource, and $N_{CTU}$ is a quantity of CTUs included in a current subframe.

With reference to any one of the fifth aspect or the foregoing possible implementations of the fifth aspect, in a tenth possible implementation of the fifth aspect, the code resource comprised in the first or the third transmission resource includes one of the following: a sparse code multiple access codebook, a low density signature sequence, or a Code Division Multiple Access code.

With reference to any one of the fifth aspect or the foregoing possible implementations of the fifth aspect, in an eleventh possible implementation of the fifth aspect, the transmitting unit is specifically configured to transmit the first uplink data and the jointly coded data to the network device in a grant-free transmission manner.

With reference to any one of the fifth aspect or the foregoing possible implementations of the fifth aspect, in a twelfth possible implementation of the fifth aspect, the apparatus is the first terminal device.

According to a sixth aspect, another uplink data transmission apparatus is provided, including: a determining unit, configured to determine to-be-transmitted uplink data and a transmission resource for the uplink data, and a transmitting unit, configured to transmit the uplink data determined by the determining unit and information about the transmission resource to a first terminal device, and transmit the uplink data to a network device using the transmission resource determined by the determining unit.

In a first possible implementation of the sixth aspect, the apparatus further includes: a first receiving unit, configured to, before the transmitting unit transmits the uplink data and the information about the transmission resource to the first terminal device, receive first instruction information transmitted by the network device, where the first instruction information is used to instruct the first terminal device and a second terminal device to perform transmit diversity transmission, and the determining unit is further configured to determine, according to the first instruction information received by the first receiving unit, to perform transmit diversity transmission with the first terminal device.

With reference to any one of the sixth aspect or the first implementation of the sixth aspect, in a second possible implementation of the sixth aspect, the first instruction information includes group identifier information of a terminal device group to which the first terminal device belongs and number information of the first terminal device in the terminal device group.

With reference to any one of the sixth aspect or the foregoing possible implementations of the sixth aspect, in a third possible implementation of the sixth aspect, the apparatus further includes a second receiving unit, configured to: before the transmitting unit transmits the uplink data and the information about the transmission resource to the first terminal device, receive a transmit diversity transmission request transmitted by the first terminal device, where the transmit diversity transmission request is used to request to perform transmit diversity transmission with the first terminal device, the determining unit is further configured to determine, according to the transmit diversity transmission request received by the second receiving unit, to perform transmit diversity transmission with the first terminal device, and the transmitting unit is further configured to transmit a transmit diversity transmission response to the first terminal device.

With reference to any one of the sixth aspect or the foregoing possible implementations of the sixth aspect, in a fourth possible implementation of the sixth aspect, the apparatus further includes a check code addition unit, configured to: before the transmitting unit transmits the uplink data to the network device using the transmission resource, add a CRC code to the uplink data, where the CRC code is scrambled using an identifier of the first terminal device, and the transmitting unit is specifically configured to transmit, to the network device using the transmission resource, the uplink data to which the CRC code is added by the check code addition unit.

With reference to any one of the sixth aspect or the foregoing possible implementations of the sixth aspect, in a fifth possible implementation of the sixth aspect, the transmitting unit is specifically configured to transmit the uplink data and the information about the transmission resource to the first terminal device by means of D2D transmission.

With reference to any one of the sixth aspect or the foregoing possible implementations of the sixth aspect, in a sixth possible implementation of the sixth aspect, the information about the transmission resource includes information about a code resource, and the code resource includes one of the following a sparse code multiple access codebook, a low density signature sequence, or a Code Division Multiple Access code.

With reference to any one of the sixth aspect or the foregoing possible implementations of the sixth aspect, in a seventh possible implementation of the sixth aspect, the uplink data is transmitted by the second terminal device to the network device in a grant-free transmission manner.

With reference to any one of the sixth aspect or the foregoing possible implementations of the sixth aspect, in an eighth possible implementation of the sixth aspect, the apparatus is the second terminal device.

According to a seventh aspect, another uplink data transmission apparatus is provided, including: a receiving unit, configured to receive first uplink data transmitted by a first terminal device using a first transmission resource, and second uplink data transmitted by a second terminal device using a third transmission resource; an obtaining unit, configured to obtain jointly coded data transmitted by the first terminal device using a second transmission resource different from the first transmission resource, where the jointly coded data is obtained by performing joint coding processing on the first uplink data and the second uplink data that are received by the receiving unit, and a decoding unit, configured to obtain, according to the jointly coded data obtained by the obtaining unit and the first uplink data and the second uplink data that are received by the receiving unit, a decoding result of the first uplink data and a decoding result of the second uplink data.

In a first possible implementation of the seventh aspect, the apparatus further includes: a first determining unit, configured to, before the receiving unit receives the first uplink data transmitted by the first terminal device using the first transmission resource, and the second uplink data transmitted by the second terminal device using the third transmission resource, determine that the first terminal device and the second terminal device perform transmit diversity transmission; and a transmitting unit, configured to transmit first instruction information to at least one terminal device of the first terminal device or the second terminal device, where the first instruction information is used to indicate that, as determined by the first determining unit, the first terminal device and the second terminal device perform transmit diversity transmission.

With reference to any one of the seventh aspect or the first implementation of the seventh aspect, in a second possible implementation of the seventh aspect, the first determining unit is specifically configured to determine, according to transmission reliability information of the first terminal device and transmission reliability information of the second terminal device, that the first terminal device and the second terminal device perform transmit diversity transmission, where the transmission reliability information includes at least one piece of the following information: transmit diversity transmission capability information, quality information of a current uplink channel, or historical bit error rate information.

With reference to any one of the seventh aspect or the foregoing possible implementations of the seventh aspect, in a third possible implementation of the seventh aspect, the receiving unit is further configured to: before the receiving first uplink data transmitted by a first terminal device using a first transmission resource, and second uplink data transmitted by a second terminal device using a third transmission resource, receive second instruction information transmitted by at least one terminal device of the first terminal device or the second terminal device, where the second instruction information is used to instruct the first terminal device and the second terminal device to perform transmit diversity transmission.

With reference to any one of the seventh aspect or the foregoing possible implementations of the seventh aspect, in a fourth possible implementation of the seventh aspect, the apparatus further includes: a second determining unit, configured to: before the obtaining unit obtains the jointly coded data transmitted by the first terminal device using the second transmission resource different from the first transmission resource, determine whether a determining condition for transmit diversity transmission is satisfied, where the determining condition for transmit diversity transmission includes at least one of the following a CRC code corresponding to the first uplink data is scrambled using an identifier of the second terminal device, or a CRC code corresponding to the second uplink data is scrambled using an identifier of the first terminal device, and determine, when the determining condition for transmit diversity transmission is satisfied, that the first uplink data and the second uplink data are transmitted in a transmit diversity transmission manner.

With reference to any one of the seventh aspect or the foregoing possible implementations of the seventh aspect, in a fifth possible implementation of the seventh aspect, the first transmission resource is specifically a first CTU, the second transmission resource is a specifically a second CTU, the third transmission resource is specifically a third CTU that is different from the first CTU and the second CTU, and the third CTU is located in a contention access region different from that of the first CTU and that of the second CTU.

With reference to any one of the seventh aspect or the foregoing possible implementations of the seventh aspect, in a sixth possible implementation of the seventh aspect, the decoding unit is specifically configured to: perform demodulation processing on the received first uplink data to obtain an initial log-likelihood ratio corresponding to the first uplink data; perform demodulation processing on the received second uplink data to obtain an initial log-likelihood ratio corresponding to the second uplink data, perform demodulation processing on the jointly coded data obtained to obtain a log-likelihood ratio corresponding to the jointly coded data, determine, according to the log-likelihood ratio corresponding to the jointly coded data, the initial log-likelihood ratio corresponding to the first uplink data, and the initial log-likelihood ratio corresponding to the second uplink data, a final log-likelihood ratio corresponding to the first uplink data and a final log-likelihood ratio corresponding to the second uplink data; and perform decoding processing on the final log-likelihood ratio corresponding to the first uplink data, to obtain the decoding result of the first uplink data, and perform decoding processing on the final log-likelihood ratio corresponding to the second uplink data, to obtain the decoding result of the second uplink data.

With reference to any one of the seventh aspect or the foregoing possible implementations of the seventh aspect, in a seventh possible implementation of the seventh aspect, the decoding unit is specifically configured to: determine, according to the log-likelihood ratio corresponding to the jointly coded data, the initial log-likelihood ratio corresponding to the first uplink data, and the initial log-likelihood ratio corresponding to the second uplink data, prior probability information of the first uplink data and prior probability information of the second uplink data; determine, according to the prior probability information of the first uplink data and the initial log-likelihood ratio corresponding to the first uplink data, the final log-likelihood ratio corresponding to the first uplink data, and determine, according to the prior probability information of the second uplink data and the initial log-likelihood ratio corresponding to the second uplink data, the final log-likelihood ratio corresponding to the second uplink data.

With reference to any one of the seventh aspect or the foregoing possible implementations of the seventh aspect, in an eighth possible implementation of the seventh aspect, the obtaining unit is specifically configured to obtain information about the first transmission resource and information about the third transmission resource, determine the second transmission resource according to the information about the first transmission resource and the information about the third transmission resource, and obtain the jointly coded data transmitted using the second transmission resource.

With reference to any one of the seventh aspect or the foregoing possible implementations of the seventh aspect, in a ninth possible implementation of the seventh aspect, if the second transmission resource is specifically the second CTU, an index $\text{Indx}_{CTU}$ of the second CTU is determined using the following formula:

$$\text{Indx}_{CTU} = (\text{Sig}_1 + \text{Sig}_2) \bmod N_{CTU};$$

where $\text{Sig}_1$ is an index of a code resource included in the first transmission resource, $\text{Sig}_2$ is an index of a code resource included in the third transmission resource, and $N_{CTU}$ is a quantity of CTUs included in a current subframe.

With reference to any one of the seventh aspect or the foregoing possible implementations of the seventh aspect, in a tenth possible implementation of the seventh aspect, the code resource comprised in the first or the third transmission resource includes one of the following: a sparse code multiple access codebook, a low density signature group, or a Code Division Multiple Access code group.

With reference to any one of the seventh aspect or the foregoing possible implementations of the seventh aspect, in an eleventh possible implementation of the seventh aspect, the receiving unit is specifically configured to receive the first uplink data and the second uplink data that are transmitted in a grant-free transmission manner by the first terminal device and the second terminal device respectively.

With reference to any one of the seventh aspect or the foregoing possible implementations of the seventh aspect, in a twelfth possible implementation of the seventh aspect, the apparatus is the network device.

According to an eighth aspect, another uplink data transmission apparatus is provided, including: a determining unit, configured to: determine that a first terminal device performs transmit diversity transmission with a second terminal device; and a transmitting unit, configured to transmit first instruction information to at least one terminal device of the first terminal device or the second terminal device, where the first instruction information is used to indicate that, determined by the determining unit, the first terminal device and the second terminal device perform transmit diversity transmission.

In a first possible implementation of the eighth aspect, the determining unit is specifically configured to determine, according to transmission reliability information of the first terminal device and transmission reliability information of the second terminal device, that the first terminal device and the second terminal device perform transmit diversity transmission, where the transmission reliability information includes at least one piece of the following information, selected from transmit diversity transmission capability information, quality information of a current uplink channel, or historical bit error rate information.

Based on the foregoing solutions and according to the uplink data transmission method and apparatus provided in the embodiments of the present invention, a first terminal device and a second terminal device transmit uplink data using a transmit diversity transmission mechanism, and the first terminal device obtains second uplink data of the second terminal device, performs joint coding processing on to-be-transmitted first uplink data and the second uplink data to obtain jointly coded data, and transmits the first uplink data and the jointly coded data to a network device using different transmission resources. This can reduce a transmission delay while transmit diversity gains are obtained.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
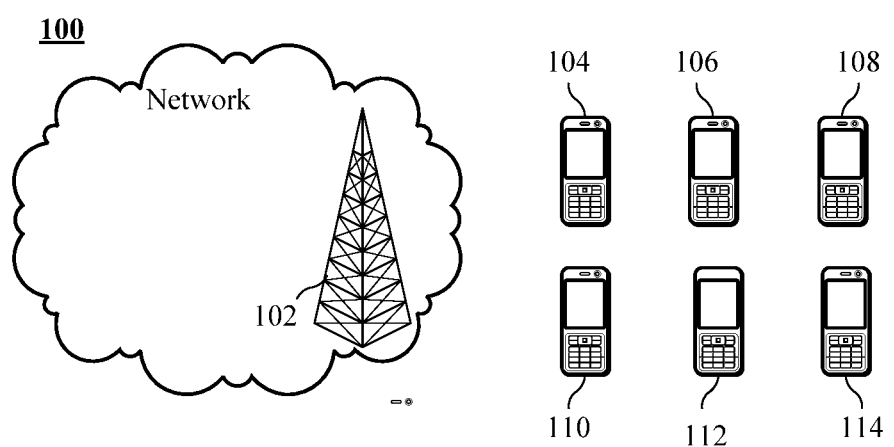
FIG. 1 is a schematic diagram of a communications system to which an embodiment may be applied.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, for example, a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system, and a future 5G communications system in a future evolved public land mobile network (PLMN).

It should be further understood that the technical solutions in the embodiments of the present invention may be further applied to various communications systems based on a non-orthogonal multiple access technology, for example, a sparse code multiple access (SCMA) system. Certainly, SCMA may also be referred to as another name in the communication field. Further, the technical solutions in the embodiments of the present invention may be applied to a multi-carrier transmission system using the non-orthogonal multiple access technology, for example, an orthogonal frequency division multiplexing (OFDM) system, a filter bank multi-carrier (FBMC) system, a generalized frequency division multiplexing (GFDM) system, or a filtered frequency division multiplexing (F-OFDM) system using the non-orthogonal multiple access technology.

It should be further understood that in the embodiments of the present invention, a terminal device may communicate with one or more core networks using a radio access network (RAN). The terminal device may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device with a wireless communication function, a computation device or another processing device connected to a wireless modem, an in-vehicle device, a wearable device, a terminal device in a future 5G network, a terminal device in a future evolved public land mobile network (PLMN), or the like.

It should be further understood that in the embodiments of the present invention, a network device may be configured to communicate with a terminal device. The network device may be a base transceiver station (BTS) in a GSM system or a CDMA system, may be a NodeB (NB) in a WCDMA system, or may be an evolved NodeB (eNB or eNodeB) in an LTE system. Alternatively, the network device may be a relay station, an access point, an in-vehicle device, a wearable device, a network-side device in a future 5G network, a network device in a future evolved PLMN network, or the like.

An existing cellular communications system, such as a GSM system, a WCDMA system, or an LTE system supports mainly voice and data communication. Generally, a quantity of connections supported by a conventional base station is limited and is easy to implement.

A next-generation mobile communications system not only supports conventional communication, but also supports machine to machine (M2M) communication which is also referred to as machine type communication (MTC). It is predicted that a quantity of MTC devices connected over networks will be up to 50 billion to 100 billion in 2020. This quantity is far greater than a current quantity of connections. M2M services are diverse in service types and different types of M2M services have quite different network requirements. Roughly, there may exist the following several requirements: (I) reliable transmission, but insensitive to a delay; (II) a low delay, and highly reliable transmission.

A service that requires reliable transmission but is insensitive to a delay is relatively easy to handle. However, a highly reliable low-delay transmission service, such as a V2V (V2V) service, requires not only a low transmission delay but also high reliability. If transmission is unreliable, retransmission is caused. As a result, the transmission delay is excessively high, and requirements cannot be met.

Existence of a large quantity of connections makes a future wireless communications system differ greatly from an existing communications system. A large quantity of connections need to consume more resources for terminal device access and for scheduling signaling transmission that is related to data transmission by a terminal device.

FIG. 1 is a schematic diagram of an architecture of a system 100 to which an embodiment of the present invention may be applied. The system 100 includes a network device 102 and multiple terminal devices 104 to 114 located within coverage of the network device 102. The network device 102 may be connected to the multiple terminal devices in a wireless manner, a wired manner, or another manner. In addition, the network device 102 may support simultaneous transmission of multiple cellular carriers. FIG. 1 shows an example of one network device and six terminal devices. Optionally, the system 100 may include multiple network devices, and another quantity of terminal devices may be within coverage of each network device. This is not limited in this embodiment of the present invention.

A network in this embodiment of the present invention may be a PLMN, a D2D network, an M2M network, or another network. FIG. 1 is a simplified schematic diagram used merely as an example. The network may further include another network device, which is not shown in FIG. 1.

To deal with a large quantity of MTC services in a future network and satisfy low-delay and high-reliability service transmission, the network device 102 in the system 100 may use a grant-free transmission solution. The solution may be applicable to uplink data transmission. In the grant-free transmission mechanism, instead of requesting the network device to allocate a transmission resource using a scheduling request, a terminal device directly contends for a resource and transmits uplink data, thereby reducing system signaling overheads and a transmission delay.

Grant-free transmission may be understood as any one or more of the following meanings, or a combination of some technical features in multiple meanings of the following meanings.

1. Grant-free transmission may mean that a network device preallocates multiple transmission resources to a terminal device and informs the terminal device of the multiple transmission resources, and when the terminal device has an uplink data transmission requirement, the terminal device selects at least one transmission resource from the multiple transmission resources preallocated by the network device, and transmits uplink data using the selected transmission resource. The network device detects, on at least one transmission resource of the preallocated multiple transmission resources, the uplink data transmitted by the terminal device. The detection may be blind detection, may be detection performed according to a control information related to the uplink data, or may be detection performed in another manner.

The blind detection may be understood as detection performed, when it is unknown in advance whether data arrives, on data that may arrive. The blind detection may also be understood as detection performed without an explicit signaling indication.

2. Grant-free transmission may mean that a network device preallocates multiple transmission resources to a terminal device and informs the terminal device of the multiple transmission resources, so that when the terminal device has an uplink data transmission requirement, the terminal device selects at least one transmission resource from the multiple transmission resources preallocated by the network device, and transmits uplink data using the selected transmission resource.

3. Grant-free transmission may mean that a terminal device obtains information about preallocated multiple transmission resources, and when there is an uplink data transmission requirement, selects at least one transmission resource from the multiple transmission resources and transmits the uplink data using the selected transmission resource. The terminal device may obtain the information about the multiple transmission resources in multiple manners. For example, a mapping relationship between a terminal device and a transmission resource may be defined in a protocol, or may be indicated by a network device using an instruction.

4. Grant-free transmission may refer to a method for transmitting uplink data by a terminal device without dynamic scheduling performed by a network device. The dynamic scheduling may be a scheduling manner in which the network device needs to indicate, using signaling, a transmission resource for each uplink data transmission of the terminal device. Optionally, the transmission resource may be a transmission resource of one or more transmission time units that are after a time point at which the terminal device receives the signaling. One transmission time unit may be a minimum time unit of one transmission, for example, a transmission time interval (Transmission Time Interval, TTI), and its value may be 1 ms. Alternatively, one transmission time unit may be a preset transmission time unit. Optionally, transmitting uplink data by a terminal device may be understood as allowing two or more than two terminal devices to transmit uplink data on a same time-frequency resource.

5. Grant-free transmission may mean that a terminal device transmits uplink data without being granted by a network device. The grant may mean that a terminal device transmits an uplink scheduling request to a network device, and after receiving the scheduling request, the network device transmits an uplink grant (UL grant) to the terminal device, where the uplink grant is used to indicate an uplink transmission resource allocated to the terminal device.

6. Grant-free transmission may refer to a contention transmission mode that may specifically mean that multiple terminal devices simultaneously transmit uplink data on a same preallocated time-frequency resource without a grant from a network device.

Optionally, the foregoing data may include service data or signaling data.

In a grant-free transmission mechanism, a transmission resource may include but is not limited to one of the following resources or a combination of more than one of the following resources: a time domain resource, such as a radio frame, a subframe, or a symbol; a frequency domain resource, such as a subcarrier or a resource block; a space domain resource, such as an transmit antenna or a beam; a code domain resource, such as a sparse code multiple access (SCMA) codebook, a low density signature (LDS) sequence, or a CDMA code, or an uplink pilot resource.

A contention transmission unit (CTU) may be a basic transmission resource for grant-free transmission. The CTU may be a transmission resource with a combination of a time, a frequency, and a code domain, may be transmission resource with a combination of a time, a frequency, and a pilot, or may be a transmission resource with a combination of a time, a frequency, a code domain, and a pilot.

A CTU access region may be an access region corresponding to the CTU.

The foregoing transmission resource may be used for transmission performed according to a control mechanism including but not limited to the following: uplink power control, such as control of an upper limit of uplink transmit power; modulation and coding scheme setting, such as transport block size setting, code rate setting, or modulation order setting; and a retransmission mechanism.

In a grant-free transmission mechanism, at least one contention access region (CAR) is defined in a time-frequency domain. The CAR may also be referred to as a CTU access region, or another name with a same or similar meaning. The CAR may be a time-frequency region used for grant-free transmission. Different CARs may be corresponding to different time-frequency resources respectively, and each CAR may further include at least one contention transmission unit (CTU). The CTU may be a basic transmission resource unit for grant-free transmission. The CTU may be at least one resource combination of a time resource, a frequency resource, a code resource, or a pilot resource. For example, the CTU may be a transmission resource including a time resource, a frequency resource, and a code domain resource, or may be a transmission resource including a time resource, a frequency source, and a pilot resource, or may be a transmission resource including a time resource, a frequency source, a code domain resource, and a pilot resource. This is not limited in this embodiment of the present invention. A patent application numbered PCT/CN2014/073084 and entitled "System And Method For Uplink Grant-Free Transmission Scheme" provides a technical solution for grant-free transmission. Transmission resources may be divided into different CTUs. One code group may be allocated to each CTU. The allocated code group may be CDMA codes, or may be SCMA codebooks, LDSes or signatures, or the like. Optionally, each code may be corresponding to one pilot group.

The terminal devices 104 to 114 may report their own capability information to the network device 102 after being connected to the network device 102, where the capability information may include information used to indicate whether there is a grant-free transmission capability. In this way, the network device 102 may communicate with the terminal devices using a grant-free transmission mechanism or a conventional request-grant mechanism according to the capability information reported by the terminal devices. Optionally, the network device 102 may notify the terminal devices of necessary information for grant-free transmission. For example, the network device 102 may instruct the terminal devices to perform grant-free transmission, and transmit space search information, CAR information, CTU information, modulation and coding scheme information, or the like to the terminal devices. Each terminal device is mapped to one or more CTUs, and a mapping rule may be predefined or may be configured by the network device. The terminal device may select a code and a pilot in a pilot group corresponding to the code to perform uplink transmission. This is not limited in this embodiment of the present invention.

Content of the application PCT/CN2014/073084 may be understood as a part incorporated into content of the embodiments of the present invention by reference, and for ease of brevity, no details are described.

Figure 2:
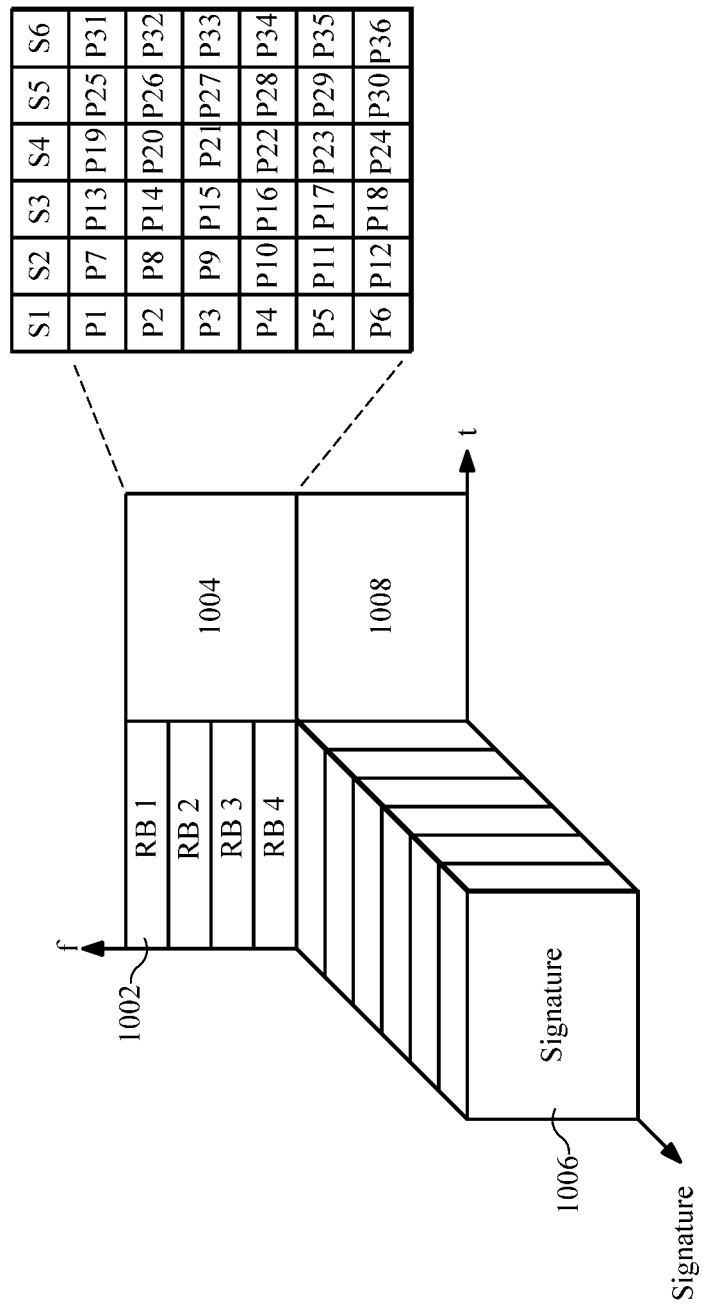
FIG. 2 is a schematic diagram of a contention transmission unit in the communications system shown in FIG. 1.

It should be further understood that the embodiments of the present invention are mainly applied to grant-free transmission scenarios shown in FIG. 1 and FIG. 2, and may be further applied to another communications system other than that shown in FIG. 1. This is not limited in the embodiments of the present invention.

FIG. 2 shows an example of four CARs 1002, 1004, 1006 and 1008. Available bandwidth of a system may be divided into multiple different time-frequency regions. Each CAR occupies a different resource block. Optionally, a quantity of resource blocks occupied by each CAR may be predefined. For example, a CAR 1002 occupies resource blocks (Resource Block, RB) 1 to 4 of a frequency band. As shown in FIG. 2, each CAR may be further divided into at least one CTU. Each CTU is a combination of a particular time, frequency, signature, and pilot. All CARs in FIG. 2 are corresponding to a same CTU mapping relationship. For description, a mapping relationship between the four CARs is shown from different perspectives separately. This is not limited in this embodiment of the present invention. As shown in FIG. 2, each CAR supports six signatures (S1 to S6), and each signature may be corresponding to six pilots. Therefore, there are a total of 36 pilots (P1 to P36), which are corresponding to 36 CTUs. This is not limited in this embodiment of the present invention.

It should be understood that, FIG. 2 shows an example of four CARs and each CAR includes 36 CTUs, but in the embodiments of the present invention, another quantity of CARs may be included and each CAR may include another quantity of CTUs. This is not limited in this embodiment of the present invention.

To resolve a transmission delay problem caused by a HARQ transmission mechanism used in the prior art, this embodiment of the present invention provides an uplink transmit diversity transmission mechanism. In the mechanism, if at least two terminal devices need to transmit uplink data to a network device, for example, data 1, . . . , and data N, where N≥2, the at least two terminal devices may separately transmit corresponding uplink data to the network device, and coding processing (for example, exclusive OR processing or turbo coding processing) is performed on the uplink data corresponding to the at least two terminal devices, and a processing result is transmitted to the network device. One or more terminal devices of the at least two terminal devices perform joint coding processing on the uplink data corresponding to the at least two terminal devices respectively, that is, coding processing is performed on the uplink data corresponding to the at least two terminal devices respectively, and jointly coded data obtained by means of coding processing is transmitted to the network device. In this way, the network device may receive the data 1, . . . , and the data N, and receive the jointly coded data transmitted by the at least one terminal device of the at least two terminal devices, where the jointly coded data is obtained by performing coding processing on the data 1 to the data N. In this way, the network device may obtain, from the jointly coded data received, parts of information that are corresponding to the data 1, . . . , and the data N, and combine the parts of information obtained from the jointly coded data received and information obtained from received uplink data transmitted by each terminal device separately, that is, a part of information that is corresponding to data i (i=1, . . . , N) and that is obtained from the jointly coded data received and information obtained from the received data i transmitted separately are combined, so as to increase a probability that the network device successfully receives the uplink data transmitted by the at least two terminal devices respectively, and to improve uplink data transmission reliability. In addition, the terminal device directly transmits the jointly coded data to the network device with no need to wait for a feedback that is used to indicate that the uplink data is unsuccessfully received and that is transmitted by the network device. Therefore, compared with that in the prior art, a transmission delay can be reduced.

Figure 3:
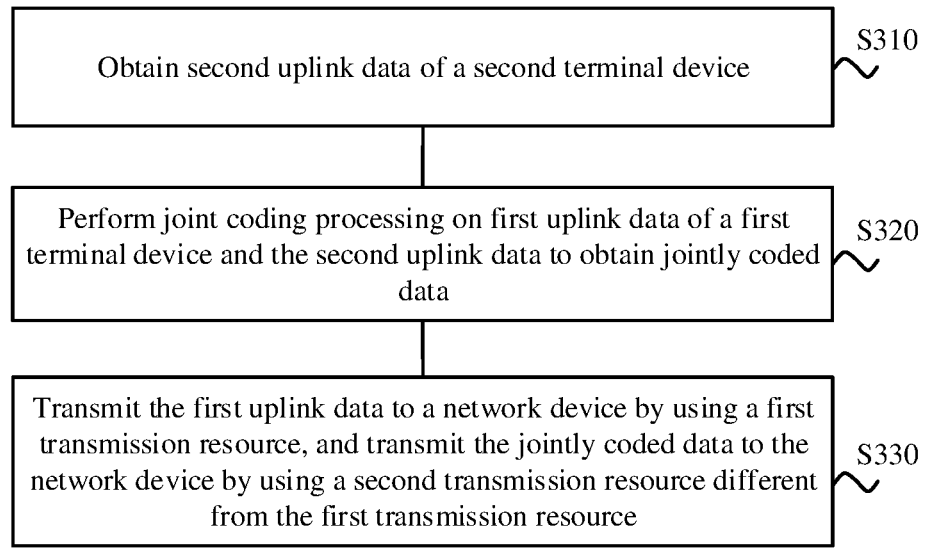
FIG. 3 is a schematic flowchart of an uplink data transmission method according to an embodiment.

FIG. 3 shows an uplink data transmission method 300 according to an embodiment of the present invention. The method 300 may be executed by a first terminal device.

S310. Obtain second uplink data of a second terminal device.

The first terminal device may obtain the second uplink data from a network device or the second terminal device. Optionally, the first terminal device may obtain the second uplink data of the second terminal device when determining to perform transmit diversity transmission with the second terminal device, or the first terminal device may determine to perform transmit diversity transmission with the second terminal device when obtaining the second uplink data of the second terminal device. This is not limited in this embodiment of the present invention.

S320. Perform joint coding processing on first uplink data of the first terminal device and the second uplink data to obtain jointly coded data.

The first terminal device may perform coding processing, for example, network coding or turbo coding, on the first uplink data and the second uplink data to obtain the jointly coded data.

S330. Transmit the first uplink data to a network device using a first transmission resource, and transmit the jointly coded data to the network device using a second transmission resource different from the first transmission resource.

The first terminal device may perform coding processing on the first uplink data, transmit, to the network device using the first transmission resource, the first uplink data obtained after coding processing, and transmit the jointly coded data to the network device using the second transmission resource. In addition, the second terminal device may also perform coding processing on the second uplink data, and transmit, to the network device using a third transmission resource, the second uplink data obtained after coding processing. The third transmission resource may be different from the second transmission resource. Optionally, the third transmission resource and the first transmission resource may be a same transmission resource or different transmission resources. This is not limited in this embodiment of the present invention.

It should be understood that in this embodiment of the present invention, the uplink data is data transmitted to the network device by a terminal device using an uplink transmission link. This is not limited in this embodiment of the present invention.

Therefore, according to the uplink data transmission method provided in this embodiment of the present invention, a first terminal device and a second terminal device transmit uplink data using a transmit diversity transmission mechanism, and the first terminal device obtains second uplink data of the second terminal device, performs joint coding processing on to-be-transmitted first uplink data and the second uplink data to obtain jointly coded data, and transmits the first uplink data and the jointly coded data to a network device using different transmission resources. This can reduce a transmission delay while transmit diversity gains are obtained.

Specifically, there may be one or more second terminal devices. In addition, the first terminal device may perform transmit diversity transmission with the second terminal device during one or more times of uplink data transmission. For example, the first terminal device may perform transmit diversity transmission with the second terminal device each time when uplink data is transmitted, or the first terminal device may perform transmit diversity transmission with another terminal device different from the second terminal device during one or more times of uplink data transmission, or the first terminal device uses a non-transmit diversity mode during one or more times of uplink data transmission. This is not limited in this embodiment of the present invention.

In this embodiment of the present invention, the first terminal device may use multiple manners to determine to perform transmit diversity transmission with the second terminal device. For example, the network device provides an instruction using signaling, or a D2D manner is used to broadcast a request and receive a response, or the network device groups at least one terminal device served by the network device. The first terminal device may perform transmit diversity transmission with another terminal device in a group to which the first terminal device belongs, or the like. This is not limited in this embodiment of the present invention.

In an optional embodiment, before step S310, the method 300 further includes receiving first instruction information transmitted by the network device, where the first instruction information is used to instruct the first terminal device and the second terminal device to perform transmit diversity transmission, and determining, according to the first instruction information, to perform transmit diversity transmission with the second terminal device.

Optionally, the network device may determine that the first terminal device and the second terminal device perform transmit diversity transmission, according to information about the first terminal device and information about the second terminal device, for example, capability information (for example, whether there is a transmit diversity transmission capability), whether there is an intention to perform transmit diversity transmission, service type information, quality information of a current uplink channel, or historical transmission reliability information (for example, a bit error rate). Optionally, in another embodiment, the network device may further determine that which terminal device or terminal devices of the first terminal device or the second terminal device transmit the jointly coded data. For example, at least one target terminal device, used for transmitting the jointly coded data, of the first terminal device or the second terminal device is determined according to capability information, quality information of a current channel, or the like of the first terminal device and capability information, quality information of a current channel, or the like of the second terminal device. Optionally, the first instruction information may be further used to indicate the at least one target terminal device, used for transmitting the jointly coded data, of the first terminal device or the second terminal device. This is not limited in this embodiment of the present invention.

After the first terminal device and the second terminal device are attached to the network device, the network device may actively make a decision to enable the first terminal device and the second terminal device to perform transmit diversity transmission, or may make, according to a received transmit diversity transmission request transmitted by the first terminal device and/or the second terminal device, a decision to enable the first terminal device and the second terminal device to perform transmit diversity transmission. The decision may change dynamically, that is, the first instruction information is applicable only to current uplink data transmission, or the decision is semi-static, that is, the first instruction information is applicable to uplink data transmission during a period of time (until instruction information transmitted by the network device is received next time), or the decision remains unchanged during a period in which the first terminal device and the second terminal device reside. This is not limited in this embodiment of the present invention.

The first instruction information may be carried in higher layer signaling or physical layer signaling, for example, the first instruction information is explicitly or implicitly indicated using a downlink control channel. This is not limited in this embodiment of the present invention. If the network device groups multiple terminal devices, optionally, the first instruction information may include group identifier information of a second terminal device group to which the second terminal device belongs, or further includes group identifier information of a first terminal device group to which the first terminal device belongs. The first terminal device group and the second terminal device group may be a same group, or may be different groups. Optionally, the first instruction information may further include number information of the second terminal device in the second terminal device group. The number information may be specifically a short identifier, and may uniquely identify the second terminal device in the second terminal device group. Therefore, compared with that the first instruction information includes identifier information (for example, a device identifier, a user identifier, or a cell radio network temporary identifier) of the second terminal device, overheads of the first instruction information can be reduced.

Optionally, if the first terminal device and the second terminal device belong to a same terminal device group, that is, the first terminal device group is the same as the second terminal device group, the first instruction information may include only number information of the second terminal device in the terminal device group. Correspondingly, the network device may determine the second terminal device according to the group identifier information and the number information; or the first instruction information may further include the group identifier information of the terminal device group and/or the number information of the first terminal device in the terminal device group. This is not limited in this embodiment of the present invention.

In another optional embodiment, before step S310, the method 300 further includes transmitting a transmit diversity transmission request to at least one terminal device including the second terminal device, where the transmit diversity transmission request is used to request to perform transmit diversity transmission with the first terminal device, receiving a transmit diversity transmission response transmitted by the second terminal device according to the transmit diversity transmission request, and determining, according to the received transmit diversity transmission response, to perform transmit diversity transmission with the second terminal device.

When learning a failure of previous uplink data transmission, the first terminal device may determine that transmit diversity transmission needs to be performed, and transmit the transmit diversity transmission request, or transmit the transmit diversity transmission request when determining that there is to-be-transmitted uplink data. This is not limited in this embodiment of the present invention. The first terminal device may transmit the transmit diversity transmission request in a D2D manner. Optionally, the first terminal device may broadcast the transmit diversity transmission request. Alternatively, if the first terminal device belongs to a terminal device group, the first terminal device may transmit the transmit diversity transmission request in a multicast manner to at least one other user equipment included in the terminal device group, or the first terminal device may transmit the transmit diversity transmission request in a unicast manner to each terminal device of at least one terminal device including the second terminal device. This is not limited in this embodiment of the present invention.

Optionally, the transmit diversity transmission request may carry at least one piece of the following information: identifier information, capability information, service type information, information about to-be-transmitted uplink data, and information about a transmission resource of the first terminal device, or the transmit diversity transmission request may carry other information. This is not limited in this embodiment of the present invention. The terminal device that receives the transmit diversity transmission request may determine, according to the transmit diversity transmission request and a situation (for example, historical information of uplink data transmission, whether there is a capability of performing transmit diversity transmission, or information about a transmission resource) of the terminal device, whether to perform transmit diversity transmission with the first terminal device. If agreeing to perform transmit diversity transmission with the first terminal device, the terminal device may transmit a transmit diversity transmission response to the first terminal device in a unicast, multicast, or broadcast manner. The first terminal device may determine, according to the received transmit diversity transmission response, to perform transmit diversity transmission with which terminal device or terminal devices. Optionally, the transmit diversity transmission response may carry at least one piece of the following information: identifier information of the second terminal device, information about to-be-transmitted uplink data of the second terminal device, and information about a transmission resource of the second terminal device, or the transmit diversity transmission response may carry other information. This is not limited in this embodiment of the present invention.

In another embodiment, the second terminal device may transmit the transmit diversity transmission request. In this case, the first terminal device may receive a transmit diversity transmission request transmitted by the second terminal device, determine, according to the transmit diversity transmission request, to perform transmit diversity transmission with the second terminal device, and transmit a transmit diversity transmission response to the second terminal device. This is not limited in this embodiment of the present invention.

Optionally, in another embodiment, the first terminal device and/or the second terminal device may further transmit second instruction information to the network device, so as to instruct the first terminal device and the second terminal device to perform transmit diversity transmission. Correspondingly, the method 300 further includes: transmitting the second instruction information to the network device. The second instruction information is used to instruct the first terminal device and the second terminal device to perform transmit diversity transmission.

The second instruction information may explicitly or implicitly instruct the first terminal device and the second terminal device to perform transmit diversity transmission. In an optional embodiment, the first terminal device may perform cyclic redundancy check (Cyclic Redundancy Check, CRC) processing when transmitting the first uplink data and/or the jointly coded data, that is, a CRC code is added to the first uplink data and/or the jointly coded data, and the CRC code is scrambled using an identifier of the second terminal device, to implicitly instruct the first terminal device and the second terminal device to perform transmit diversity transmission. In this case, optionally, before step S330, the method 300 further includes adding a CRC code to the first uplink data, where the CRC code is scrambled using an identifier of the second terminal device.

Correspondingly, in step S330, the first terminal device transmits, to the network device, the first uplink data to which the CRC code is added.

In this way, the network device scrambles the CRC code of the first uplink data using the identifier of the second terminal device, and can determine that the first terminal device and the second terminal device perform transmit diversity transmission. Optionally, when transmitting the second uplink data to the network device, the second terminal device may scramble a CRC code of the second uplink data using the identifier of the first terminal device, so as to indicate that the second uplink data is transmitted in a transmit diversity manner. In addition, the first terminal device and/or the second terminal device may be instructed in another manner. This is not limited in this embodiment of the present invention.

In step S310, the first terminal device may use multiple manners to obtain the second uplink data of the second terminal device. Optionally, step S310 of obtaining the second uplink data of the second terminal device includes: receiving, by means of D2D transmission, the second uplink data transmitted by the second terminal device.

The second terminal device may transmit the second uplink data to the first terminal device in an in-band transmission manner or an out-of-band transmission manner, that is, the second terminal device may transmit the second uplink data to the first terminal device using a grant carrier or a grant-free carrier. In addition, the second terminal device may transmit the second uplink data in a unicast manner or a broadcast manner. This is not limited in this embodiment of the present invention. Optionally, the transmit diversity transmission response may carry the second uplink data, so as to reduce signaling interaction between the first terminal device and the second terminal device. This is not limited in this embodiment of the present invention.

In step S320, the first terminal device may perform joint coding processing on the first uplink data and the second uplink data to obtain the jointly coded data. The coding processing may be exclusive OR processing. For example, assuming that the first uplink data is $m_1$, and the second uplink data is $m_2$, the first terminal device may perform network coding on $m_1$ and $m_2$ to obtain jointly coded data $m_3$, where $m_3 = m_1 \otimes m_2$, and $\otimes$ is an exclusive OR operation. Optionally, the first terminal device may perform other coding processing, for example, turbo coding, on the first uplink data and the second uplink data. This is not limited in this embodiment of the present invention.

In step S330, the first terminal device transmits the first uplink data and the jointly coded data to a network device using different transmission resources. That the first transmission resource is different from the second transmission resource may mean that at least one of the following resources included in the first transmission resource is different from that of the second transmission resource: time, a frequency, a code, or a pilot. For example, the first transmission resource and the second transmission resource may have a same time-frequency resource, but have different code resources; or the first transmission resource and the second transmission resource have a same time-frequency resource and code resource, but have different pilot resources. This is not limited in this embodiment of the present invention.

In this embodiment of the present invention, only the first terminal device may transmit the jointly coded data while the second terminal device transmits only the second uplink data. Optionally, in another embodiment, the second terminal device may transmit the jointly coded data. Correspondingly, the method 300 further includes: transmitting the first uplink data to the second terminal device by means of D2D transmission, so that the second terminal device may perform similar processing, that is, performing joint coding processing on the first uplink data and the second uplink data to obtain the jointly coded data, and transmitting the jointly coded data to the network device. This is not limited in this embodiment of the present invention.

In this embodiment of the present invention, the first terminal device may first determine the first transmission resource used to transmit the first uplink data, and then determine, according to the first transmission resource, the second transmission resource used to transmit the jointly coded data. In an optional embodiment, before the transmitting the jointly coded data, the method 300 further includes obtaining information about a third transmission resource used by the second terminal device to transmit the second uplink data; and determining, according to the information about the third transmission resource and the first transmission resource, the second transmission resource used to transmit the jointly coded data.

The first terminal device may obtain the information about the third transmission resource from a message transmitted by the second terminal device. In an optional embodiment, the transmit diversity transmission response carries the information about the third transmission resource. The second terminal device may transmit the second uplink data and the information about the third transmission resource using a same message or different messages. This is not limited in this embodiment of the present invention.

Optionally, the information about the third transmission resource may include at least one of a time resource, a frequency resource, a code resource, or a pilot resource used to transmit the second uplink data. In this embodiment of the present invention, the code resource may include at least one of the following: a sparse code multiple access codebook, a low density signature sequence, or a Code Division Multiple Access code. It should be understood that what is listed above is merely used as an example for describing a specific instance of a code domain resource. This is not limited in this embodiment of the present invention. All other codebooks that can be used for transmission fall within the protection scope of the present invention.

The SCMA codebook includes at least two codewords. The SCMA codebook is used to indicate a mapping relationship between at least two data combinations and the at least two codewords. The codeword is a multi-dimensional complex number vector and is used to indicate a mapping relationship between data and multiple modulation symbols. The modulation symbol includes at least one zero modulation symbol and at least one non-zero modulation symbol.

Specifically, SCMA is a non-orthogonal multiple access technology, or certainly, a person skilled in the art may not call the technology SCMA, but call the technology another technical name. In the SCMA technology, multiple different data streams are transmitted on a same resource unit (that is, the multiple different data streams are multiplexed on the same resource unit) using codebooks, where different codebooks are used for different data streams, so as to increase resource utilization. The data streams may come from same user equipment, or may come from different user equipments.

In the SCMA technology, a codeword may represent a multi-dimensional complex number vector. There are two or more than two dimensions for the multi-dimensional complex number vector, and the multi-dimensional complex number vector is used to indicate a mapping relationship between data and two or more than two modulation symbols. The modulation symbol includes at least one zero modulation symbol and at least one non-zero modulation symbol. A relationship between a zero modulation symbol and a non-zero modulation symbol may be that a quantity of zero modulation symbols is not less than a quantity of non-zero modulation symbols, and the data may be bit data in a binary system or multi-element data. The codebook includes two or more than two codewords. Codewords included in the codebook may be different from each other. The codebook may represent a mapping relationship between a possible data combination of data of a specified length and a codeword in the codebook. The mapping relationship may be a direct mapping relationship. With the SCMA technology, data in a data stream is directly mapped as codewords in the codebook, that is, a multi-dimensional complex number vector, according to a specified mapping relationship, so that the data is extended to and transmitted on multiple resource units. The direct mapping relationship in the SCMA technology may be understood as that the data in the data stream does not need to be mapped as an intermediate modulation symbol, or that there is another intermediate processing process. The data herein may be bit data in a binary system or multi-element data, and the multiple resource units may be resource units in a time domain, a frequency domain, a space domain, a time-frequency domain, a time-space domain, and a time-frequency-space domain.

The codeword used in the SCMA may have specified sparsity, for example, a quantity of zero elements in the codewords may be not less than a quantity of modulation symbols, so that a receive end may use a multi-user detection technology to perform low-complexity decoding. Herein, the foregoing enumerated relationship between a quantity of zero elements and a modulation symbol is merely an example of sparsity for description. This is not limited in the present invention. A proportion of the quantity of zero elements to a quantity of non-zero elements may be set randomly as required.

An LDS sequence is a multi-dimensional complex number vector. The multi-dimensional vector includes at least one zero element and at least one non-zero element. The signature sequence is used to adjust an amplitude and a phase of a modulation symbol. The modulation symbol is obtained after constellation mapping is performed on data using a modulation constellation.

Specifically, the LDS technology is also a non-orthogonal multiple access and transmission technology. Certainly, the LDS technology may be further referred to as another name in the communications field. With such a technology, O (O is an integer that is not less than 1) data streams from one or more users are superposed on P (P is an integer that is not less than 1) subcarriers and transmitted. Each piece of data in each data stream is extended to the P subcarriers in a sparse spread spectrum manner. When a value of O is greater than that of P, such a technology can effectively increase a network capacity including a quantity of users that may be connected to a system, spectral efficiency, and the like. Therefore, the LDS technology has drawn more attention as an important non-orthogonal access technology, and becomes an important optional access technology evolved by a future wireless cellular network.

In an optional embodiment, the information about the third transmission resource may include information about a code resource. Optionally, the first terminal device may determine the second transmission resource according to information about a code resource included in the first transmission resource and information about a code resource included in the third transmission resource. This is not limited in this embodiment of the present invention.

In this embodiment of the present invention, the first terminal device and the second terminal device may perform transmit diversity transmission using a grant-free transmission mechanism. That is, the first terminal device transmits the first uplink data and the jointly coded data in a grant-free transmission manner, and the second terminal device transmits the second uplink data in the grant-free transmission manner. Optionally, as described above, transmission resources of a system may be divided into different CTUs. Correspondingly, different transmission resources may be corresponding to different CTUs. In this case, the first transmission resource may be specifically a first CTU, the second transmission resource may be specifically a second CTU, and the third transmission resource may be specifically a third CTU. The second CTU may be different from the first CTU and the third CTU, and the first CTU and the second CTU may be the same or different. Optionally, any two CTUs of the first CTU, the second CTU, or the third CTU may belong to a same contention access region or different contention access regions. More diversity gains can be obtained when a contention access region to which the second CTU belongs is different from that of the first CTU and that of the third CTU. This is not limited in this embodiment of the present invention.

The first terminal device may determine the first CTU and the second CTU according to a specified mapping rule. In an optional embodiment, an index $\text{Indx}_{CTU1}$ of the first CTU may be determined using the following formula:

$$\text{Indx}_{CTU1} = \text{Sig}_1 \bmod N_{CTU} \quad (1),$$

where $\text{Sig}_1$ is an index of a code resource included in the first transmission resource, $N_{CTU}$ is a quantity of CTUs in a current subframe, and specifically, the current subframe may be specifically a subframe occupied in transmitting the first uplink data.

The second terminal device may also determine the third CTU according to the same mapping rule. For example, an index $\text{Indx}_{CTU3}$ of the third CTU may be determined using the following formula:

$$\text{Indx}_{CTU3} = \text{Sig}_2 \bmod N_{CTU} \quad (2),$$

where $\text{Sig}_2$ is an index of a code resource included in the third transmission resource, and $N_{CTU}$ is a quantity of CTUs in a current subframe, that is, a subframe occupied in transmitting the second uplink data.

Optionally, the first terminal device may determine the second CTU according to the code resource included in the first CTU and the code resource included in the third CTU. In an optional embodiment, an index $\text{Indx}_{CTU2}$ of the second CTU may be determined using the following formula:

$$\text{Indx}_{CTU2} = (\text{Sig}_1 + \text{Sig}_2) \bmod N_{CTU} \quad (3).$$

Optionally, the first terminal device and the second terminal device may further determine the first CTU, the second CTU, or the third CTU according to another function form or information about another transmission resource. For example, the second CTU is determined according to the identifier of the first terminal device and the identifier of the second terminal device. This is not limited in this embodiment of the present invention.

In another optional embodiment, after receiving the first uplink data, the second uplink data, and the jointly coded data, the network device may determine whether the first uplink data and the second uplink data are successfully received. If the network device successfully receives the first uplink data and the second uplink data, current transmit diversity transmission ends, or the network device may transmit, to the first terminal device and/or the second terminal device, feedback information (for example, ACK) used to indicate a reception success. If the network device fails in receiving the first uplink data and/or the second uplink data, optionally, the network device may transmit, to the first terminal device and/or the second terminal device, feedback information (for example, NACK) used to indicate a reception failure. Correspondingly, the first terminal device and/or the second terminal device may retransmit data in a conventional manner or a transmit diversity transmission manner. For example, when the first terminal device receives the feedback information that is used to indicate that the first uplink data is unsuccessfully received and that is transmitted by the network device, the first terminal device may retransmit the first uplink data to the network device according to the feedback information, for example, retransmit the first uplink data in a conventional manner. This is not limited in this embodiment of the present invention.

Therefore, according to the uplink data transmission method provided in this embodiment of the present invention, a first terminal device and a second terminal device transmit uplink data using a transmit diversity transmission mechanism, and the first terminal device obtains second uplink data of the second terminal device, performs joint coding processing on to-be-transmitted first uplink data and the second uplink data to obtain jointly coded data, and transmits the first uplink data and the jointly coded data to a network device using different transmission resources. This can reduce a transmission delay while transmit diversity gains are obtained.

Figure 4:
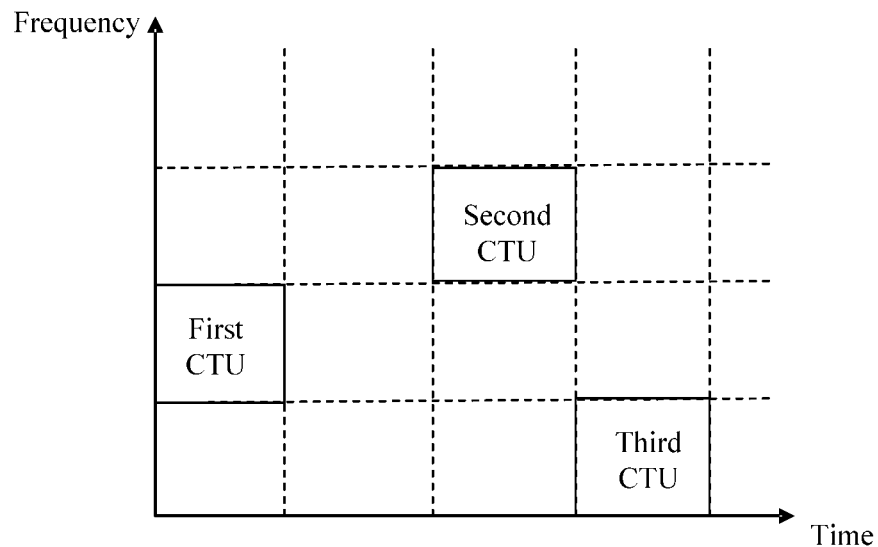
FIG. 4 is a schematic diagram of distribution of a first contention transmission unit, a second contention transmission unit, and a third contention transmission unit in the uplink data transmission method shown in FIG. 3.

FIG. 4 shows an example of distribution of the first CTU, the second CTU, and the third CTU. This is not limited in this embodiment of the present invention. In addition, in the foregoing description, an example in which the first uplink data, the second uplink data, and the jointly coded data are transmitted in a same subframe is used. In this embodiment of the present invention, at least two types of data of the first uplink data, the second uplink data, or the jointly coded data may be transmitted in different subframes. This is not limited in this embodiment of the present invention.

Therefore, according to the uplink data transmission method provided in this embodiment of the present invention, a first terminal device and a second terminal device transmit uplink data using a transmit diversity transmission mechanism, and the first terminal device obtains second uplink data of the second terminal device, performs joint coding processing on to-be-transmitted first uplink data and the second uplink data to obtain jointly coded data, and transmits the first uplink data and the jointly coded data to a network device using different transmission resources. This can reduce a transmission delay while transmit diversity gains are obtained.

Figure 5:
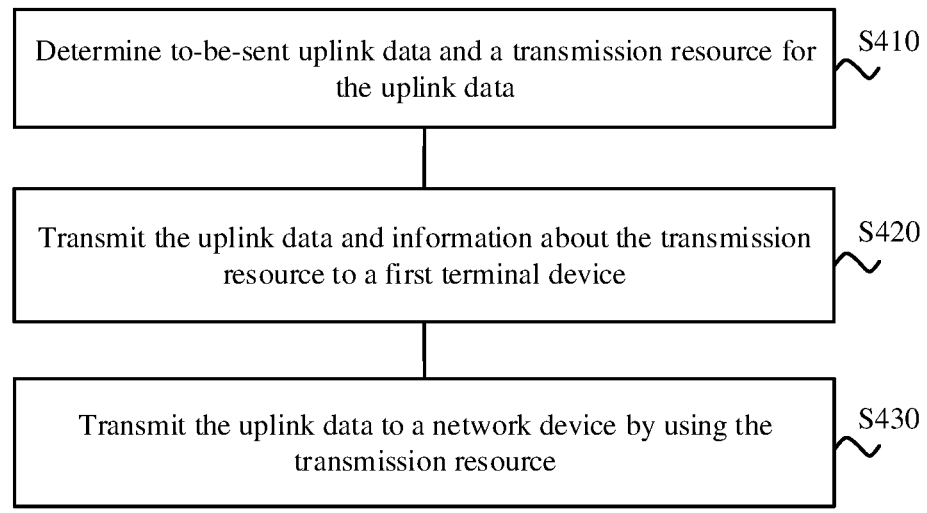
FIG. 5 is a schematic flowchart of an uplink data transmission method according to another embodiment.

FIG. 5 shows an uplink data transmission method 400 according to another embodiment of the present invention. The method 400 may be executed by a second terminal device.

S410. Determine to-be-transmitted uplink data and a transmission resource for the uplink data.

The second terminal device may determine the transmission resource for the uplink data in multiple manners. For example, when transmitting the uplink data to a network device in a grant-free transmission manner, the second terminal device may determine the transmission resource for the uplink data using formula (2) above, or may determine the transmission resource for the uplink data according to an identifier of the second terminal device. In this embodiment of the present invention, no limitation is imposed on a manner for the second terminal device to determine a transmission resource.

S420. Transmit the uplink data and information about the transmission resource to a first terminal device.

When determining to perform transmit diversity transmission with the first terminal device, the second terminal device may transmit, to the first terminal device, the uplink data to be transmitted to a network device and the information about the transmission resource used by the second terminal device to transmit the uplink data to the network device. Optionally, the second terminal device may actively transmit the uplink data to the first terminal device. For example, the second terminal device transmits the uplink data to the first terminal device when determining that the second terminal device has no capability or condition (for example, a current quantity of electricity or a volume of to-be-transmitted uplink data) of transmitting jointly coded data; or the second terminal device may transmit the uplink data to the first terminal device according to an instruction that is transmitted by the network device and that is used to instruct the first terminal device to transmit jointly coded data or to instruct the first terminal device to assist the second terminal device in transmitting the uplink data; or the second terminal device may transmit the uplink data to the first terminal device by means of negotiation with the first terminal device, for example, by receiving a request transmitted by the first terminal device. This is not limited in this embodiment of the present invention.

The first terminal device may perform joint coding processing on the received uplink data transmitted by the second terminal device and uplink data of the first terminal device to obtain jointly coded data, and transmit the jointly coded data to the network device.

In addition, the second terminal device may optionally further transmit the information about the transmission resource to the first terminal device. The information about the transmission resource is used to indicate a transmission resource used by the second terminal device to transmit the uplink data to the network device, so that the first terminal device determines, according to the information about the transmission resource, a transmission resource used to transmit jointly coded data.

S430. Transmit the uplink data to a network device using the transmission resource.

Therefore, according to the uplink data transmission method provided in this embodiment of the present invention, a first terminal device and a second terminal device transmit uplink data using a transmit diversity transmission mechanism. The second terminal device transmits, to the first terminal device, second uplink data and information about a transmission resource for the second uplink data, so that the first terminal device performs joint coding processing on to-be-transmitted first uplink data and the received second uplink data transmitted by the second terminal device, to obtain jointly coded data; and transmits the first uplink data and the jointly coded data to a network device using different transmission resources. The second terminal device transmits the second uplink data to the network device. This can reduce a transmission delay while transmit diversity gains are obtained.

In an optional embodiment, before step S420, the method 400 further includes receiving first instruction information transmitted by the network device, where the first instruction information is used to instruct the first terminal device and the second terminal device to perform transmit diversity transmission, and determining, according to the first instruction information, to perform transmit diversity transmission with the first terminal device.

Optionally, the first instruction information may be further used to instruct the first terminal device to transmit the jointly coded data. Correspondingly, the second terminal device may transmit the to-be-transmitted uplink data to the first terminal device according to the first instruction information. This is not limited in this embodiment of the present invention.

The first instruction information may explicitly or implicitly provide an instruction. In an optional embodiment, the network device may group multiple terminal devices, and the first terminal device and the second terminal device may belong to a same group or different groups. Optionally, the first instruction information includes group identifier information of a terminal device group to which the first terminal device belongs and number information of the first terminal device in the terminal device group. Optionally, the first instruction information may further include group identifier information of a second terminal device group to which the first terminal device belongs and number information of the first terminal device in the second terminal device group.

In another optional embodiment, before step S420, the method 400 further includes receiving a transmit diversity transmission request transmitted by the first terminal device, where the transmit diversity transmission request is used to request to perform transmit diversity transmission with the first terminal device, and determining, according to the transmit diversity transmission request, to perform transmit diversity transmission with the first terminal device.

Correspondingly, the method 400 further includes: transmitting a transmit diversity transmission response to the first terminal device.

The second terminal device may determine, according to the transmit diversity transmission request or uplink transmission information (current uplink channel quality, whether previous uplink transmission succeeds, a historical bit error rate, or the like) of the second terminal device, to perform transmit diversity transmission with the first terminal device. This is not limited in this embodiment of the present invention.

Optionally, the transmit diversity transmission response may carry the to-be-transmitted uplink data and/or the information about the transmission resource. This is not limited in this embodiment of the present invention.

In another optional embodiment, the second terminal device may initiate transmit diversity transmission. Correspondingly, before step S420, the method further includes transmitting a transmit diversity transmission request to at least one terminal device including the first terminal device, where the transmit diversity transmission request is used to request to perform transmit diversity transmission with the second terminal device, receiving a transmit diversity transmission response transmitted by the first terminal device according to the transmit diversity transmission request, and determining, according to the received transmit diversity transmission response, to perform transmit diversity transmission with the first terminal device.

In another optional embodiment, when the first terminal device and the second terminal device perform, by means of negotiation, transmit diversity transmission, the first terminal device and/or the second terminal device may further report the transmission manner to the network device. Correspondingly, before step S420, the method 400 further includes transmitting second instruction information to the network device, where the second instruction information is used to instruct the first terminal device and the second terminal device to perform transmit diversity transmission.

The second instruction information may explicitly or implicitly instruct the first terminal device and the second terminal device to perform transmit diversity transmission. In an optional embodiment, the second terminal device may add a CRC code to the uplink data, scramble the CRC code using an identifier of the first terminal device, and transmit, to the network device, the uplink data to which the CRC code is added, so as to implicitly indicate that the uplink data and uplink data transmitted by the first terminal device are transmitted in a transmit diversity manner. Alternatively, the first terminal device may transmit, to the network device, first uplink data to which a CRC code scrambled using an identifier of the second terminal device is added, so as to indicate that the first uplink data and the uplink data of the second terminal device are transmitted in a transmit diversity manner. This is not limited in this embodiment of the present invention.

In step S420, the second terminal device may add the to-be-transmitted uplink data and the information about the transmission resource to a same message or different messages to transmit. In addition, the second terminal device may transmit the uplink data or the information about the transmission resource to the first terminal device using a grant carrier or a grant-free carrier. This is not limited in this embodiment of the present invention.

In an optional embodiment, step S420 of transmitting the uplink data and information about the transmission resource to the first terminal device includes transmitting the uplink data and the information about the transmission resource to the first terminal device by means of D2D transmission.

Optionally, the information about the transmission resource includes at least one piece of information about a resource such as time, a frequency, a code, or a pilot. The second terminal device may transmit the uplink data in a grant-free transmission manner. Optionally, the second terminal device may map the uplink data to a CTU according to a specified mapping rule, and transmit the uplink data using the CTU. In this case, in an optional embodiment, the information about the transmission resource may include at least one of a CTU index, a code resource index, an identifier of the second terminal device, or a pilot index. This is not limited in this embodiment of the present invention.

In an optional embodiment, the information about the transmission resource may include information about a code resource, so that the first terminal device may determine, according to the information about the code resource, a second transmission resource used to transmit the jointly coded data. This is not limited in this embodiment of the present invention.

In an optional embodiment, the code resource may include one of the following: a sparse code multiple access codebook, a low density signature sequence, or a Code Division Multiple Access code. Alternatively, the code resource may be in another form. This is not limited in this embodiment of the present invention.

In another optional embodiment, the method 400 further includes: obtaining first uplink data of the first terminal device, performing joint coding processing on the first uplink data and the uplink data of the second terminal device to obtain jointly coded data, and transmit the jointly coded data to the network device using a transmission resource different from that of the uplink data of the second terminal device. The second terminal device may receive, using a D2D technology, the first uplink data transmitted by the first terminal device. This is not limited in this embodiment of the present invention.

Therefore, according to the uplink data transmission method provided in this embodiment of the present invention, a first terminal device and a second terminal device transmit uplink data using a transmit diversity transmission mechanism. The second terminal device transmits second uplink data and information about a second transmission resource to the first terminal device, so that the first terminal device performs joint coding processing on to-be-transmitted first uplink data and the received second uplink data transmitted by the second terminal device, to obtain jointly coded data; and transmits the first uplink data and the jointly coded data to a network device using different transmission resources. The second terminal device transmits the second uplink data to the network device. This can reduce a transmission delay while transmit diversity gains are obtained.

Figure 6:
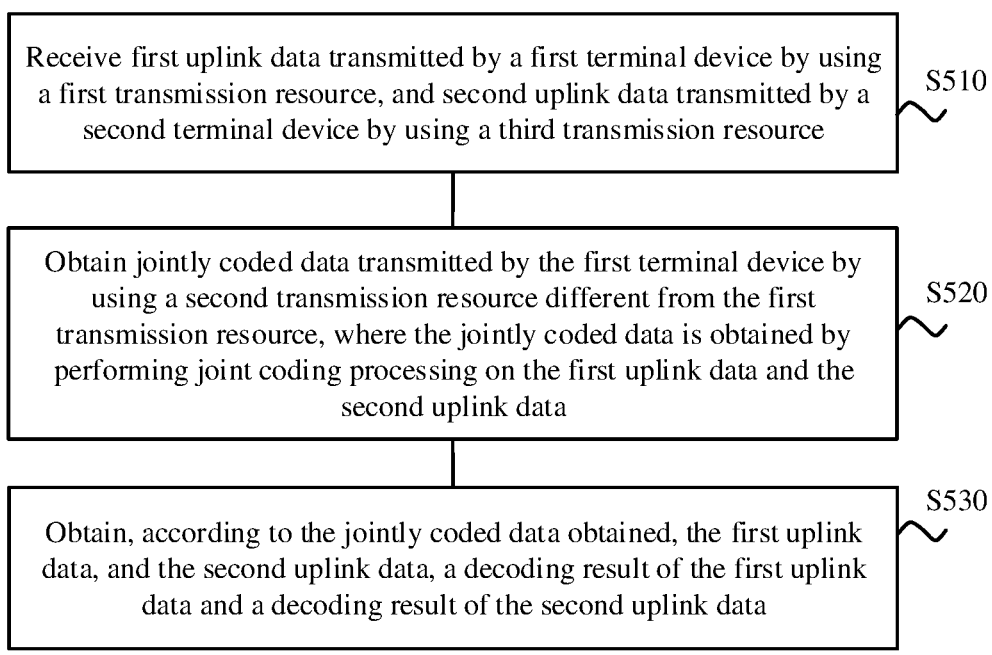
FIG. 6 is a schematic flowchart of an uplink data transmission method according to another embodiment.

FIG. 6 shows an uplink data transmission method 500 according to another embodiment of the present invention. The method 500 may be executed by a network device.

S510. Receive first uplink data transmitted by a first terminal device using a first transmission resource, and second uplink data transmitted by a second terminal device using a third transmission resource.

Optionally, the first terminal device and the second terminal device may transmit the first uplink data and the second uplink data to the network device respectively in a grant-free manner or in a conventional grant manner. This is not limited in this embodiment of the present invention.

S520. Obtain jointly coded data transmitted by the first terminal device using a second transmission resource different from the first transmission resource, where the jointly coded data is obtained by performing joint coding processing on the first uplink data and the second uplink data.

The first transmission resource and the third transmission resource may be a same transmission resource or different transmission resources. The second transmission resource is different from the first transmission resource. Optionally, the second transmission resource may be a transmission resource different from the third transmission resource. This is not limited in this embodiment of the present invention.

S530. Obtain, according to the jointly coded data obtained, the first uplink data, and the second uplink data, a decoding result of the first uplink data and a decoding result of the second uplink data.

The network device may obtain, according to the jointly coded data received, a part corresponding to the first uplink data and a part corresponding to the second uplink data that are included in the jointly coded data; combine the part corresponding to the first uplink data and the received first uplink data to obtain diversity gains for the first uplink data; and combine the part corresponding to the second uplink data and the received second uplink data to obtain diversity gains for the second uplink data. This is not limited in this embodiment of the present invention.

Therefore, according to the uplink data transmission method provided in this embodiment of the present invention, a network device receives uplink data transmitted by a first terminal device and a second terminal device using a transmit diversity transmission mechanism. Specifically, the network device receives first uplink data and second uplink data that are transmitted by the first terminal device and the second terminal device respectively, obtains jointly coded data obtained by performing joint coding processing on the first uplink data and the second uplink data, and performs, according to the jointly coded data, decoding processing on the first uplink data and the second uplink data that are received. This can reduce a transmission delay while transmit diversity gains are obtained.

In an optional embodiment, before step S510, the method 500 further includes determining that the first terminal device and the second terminal device perform transmit diversity transmission, and transmitting first instruction information to at least one terminal device of the first terminal device or the second terminal device, where the first instruction information is used to instruct the first terminal device and the second terminal device to perform transmit diversity transmission.

The network device may actively or passively (for example, according to a request of the first terminal device and/or a request of the second terminal device) determine that the first terminal device and the second terminal device perform transmit diversity transmission. Optionally, the determining that the first terminal device and the second terminal device perform transmit diversity transmission includes determining, according to transmission reliability information of the first terminal device and transmission reliability information of the second terminal device, that the first terminal device and the second terminal device perform transmit diversity transmission, where the transmission reliability information includes at least one piece of the following information: a transmit diversity transmission capability information, quality information of a current uplink channel, or historical bit error rate information.

In another optional embodiment, the first terminal device and the second terminal device may determine, by means of negotiation, to perform transmit diversity transmission. Correspondingly, before step S510, the method 500 further includes receiving second instruction information transmitted by at least one terminal device of the first terminal device or the second terminal device, where the second instruction information is used to instruct the first terminal device and the second terminal device to perform transmit diversity transmission.

The network device determines, according to the second instruction information, that the first terminal device and the second terminal device perform transmit diversity transmission. Optionally, in another optional embodiment, the second instruction information may be further used to indicate at least one of the first transmission resource, the second transmission resource, or the third transmission resource. Correspondingly, the network device may determine at least one of the first transmission resource, the second transmission resource, or the third transmission resource according to an instruction of the second instruction information; or the network device may determine, according to a predefined mapping rule or a mapping rule configured by the network device, the first transmission resource, the second transmission resource, and the third transmission resource that are corresponding to the first uplink data, the second uplink data, and the jointly coded data respectively. This is not limited in this embodiment of the present invention.

In another optional embodiment, the first terminal device may scramble, using an identifier of the second terminal device, a CRC code added to the first uplink data, and/or the second terminal device scrambles, using an identifier of the first terminal device, a CRC code added to the second uplink data, so as to implicitly indicate that the first uplink data and the second uplink data are transmitted in a transmit diversity transmission manner. That is, the first terminal device and the second terminal device perform transmit diversity transmission. In this case, before step S520, the method 500 further includes determining whether a determining condition for transmit diversity transmission is satisfied, where the determining condition for transmit diversity transmission includes at least one of the following: the cyclic redundancy check CRC code corresponding to the first uplink data is scrambled using the identifier of the second terminal device, or the CRC code corresponding to the second uplink data is scrambled using the identifier of the first terminal device, and determining, when the determining condition for transmit diversity transmission is satisfied, that the first uplink data and the second uplink data are transmitted in a transmit diversity transmission manner.

The first terminal device and/or the second terminal device may further use another implicit or explicit manner to indicate to the network device that the first terminal device and the second terminal device perform transmit diversity transmission. This is not limited in this embodiment of the present invention.

In an optional embodiment, step S520 of obtaining jointly coded data transmitted by the first terminal device using a second transmission resource different from the first transmission resource includes obtaining information about the first transmission resource and information about the third transmission resource, determining the second transmission resource according to the information about the first transmission resource and the information about the third transmission resource, and obtaining the jointly coded data transmitted using the second transmission resource.

Optionally, the network device may perform blind detection, and determine the first transmission resource and the third transmission resource according to first uplink data and second uplink data that are obtained by means of blind detection. Then, the network device may determine the second transmission resource according to the first transmission resource and the third transmission resource using a rule that is the same as that on a terminal device side, and detect jointly coded data transmitted using the second transmission resource. For example, the network device may determine the second transmission resource according to a code resource included in the first transmission resource and a code resource included in the third transmission resource; or the network device may extract, from uplink data obtained by means of detection, jointly coded data transmitted using the second transmission resource. This is not limited in this embodiment of the present invention.

Optionally, the first terminal device and the second terminal device may perform transmit diversity transmission using a grant-free transmission mechanism. Optionally, the first transmission resource is specifically a first CTU, the second transmission resource is a specifically a second CTU, the third transmission resource is specifically a third CTU that is different from the first CTU and the second CTU, and the third CTU is located in a contention access region different from that of the first CTU and that of the second CTU.

In another optional embodiment, if the second transmission resource is specifically the second CTU, the network device may determine the second CTU according to a code resource included in the first CTU and a code resource included in the third CTU. Optionally, an index $\text{Indx}_{CTU}$ of the second CTU is determined using the following formula:

$$\text{Indx}_{CTU} = (\text{Sig}_1 + \text{Sig}_2) \bmod N_{CTU} \qquad (4),$$

where $\text{Sig}_1$ is an index of a code resource included in the first transmission resource, $\text{Sig}_2$ is an index of a code resource included in the third transmission resource, and $N_{CTU}$ is a quantity of CTUs included in a current subframe.

In this case, the current subframe may be a subframe occupied by the first terminal device to transmit the jointly coded data. The jointly coded data, the first uplink data, and the second uplink data may occupy a same subframe, or may occupy different subframes respectively. This is not limited in this embodiment of the present invention. Optionally, the second CTU may be further determined in another function form or according to other information about a transmission resource. This is not limited in this embodiment of the present invention.

In an optional embodiment, step S530 of obtaining, according to the jointly coded data obtained, the first uplink data, and the second uplink data, a decoding result of the first uplink data and a decoding result of the second uplink data includes performing demodulation processing on the received first uplink data to obtain an initial log-likelihood ratio corresponding to the first uplink data, performing demodulation processing on the received second uplink data to obtain an initial log-likelihood ratio corresponding to the second uplink data, performing demodulation processing on the jointly coded data obtained to obtain a log-likelihood ratio corresponding to the jointly coded data, determining, according to the log-likelihood ratio corresponding to the jointly coded data, the initial log-likelihood ratio corresponding to the first uplink data, and the initial log-likelihood ratio corresponding to the second uplink data, a final log-likelihood ratio corresponding to the first uplink data and a final log-likelihood ratio corresponding to the second uplink data, and performing decoding processing on the final log-likelihood ratio corresponding to the first uplink data, to obtain the decoding result of the first uplink data, and performing decoding processing on the final log-likelihood ratio corresponding to the second uplink data, to obtain the decoding result of the second uplink data.

Specifically, the network device may perform demodulation processing on the received first uplink data $m_1$ to obtain an initial log-likelihood ratio $LLR_1$ corresponding to $m_1$, perform demodulation processing on the received second uplink data $m_2$ to obtain an initial log-likelihood ratio $LLR_2$ corresponding to $m_2$, and perform demodulation processing on the jointly coded data $m_3$ received to obtain an initial log-likelihood ratio $LLR_3$ corresponding to $m_3$. Because $m_3$ is obtained by performing coding processing on $m_1$ and $m_2$, the initial log-likelihood ratio $LLR_1$ corresponding to $m_1$ may be adjusted according to the initial log-likelihood ratio $LLR_3$ corresponding to $m_3$, to obtain a final log-likelihood ratio $LLR'_1$ corresponding to $m_1$, and the initial log-likelihood ratio $LLR_2$ corresponding to $m_2$ may be adjusted according to the initial log-likelihood ratio $LLR_3$ corresponding to $m_3$, to obtain a final log-likelihood ratio $LLR'_2$ corresponding to $m_2$. Finally, the network device may separately decode $LLR'_1$ and $LLR'_2$ to obtain the decoding result of the first uplink data and the decoding result of the second uplink data. This is not limited in this embodiment of the present invention.

In another optional embodiment, the determining, according to the log-likelihood ratio corresponding to the jointly coded data, the initial log-likelihood ratio corresponding to the first uplink data, and the initial log-likelihood ratio corresponding to the second uplink data, a final log-likelihood ratio corresponding to the first uplink data and a final log-likelihood ratio corresponding to the second uplink data includes determining, according to the log-likelihood ratio corresponding to the jointly coded data, the initial log-likelihood ratio corresponding to the first uplink data, and the initial log-likelihood ratio corresponding to the second uplink data, prior probability information of the first uplink data and prior probability information of the second uplink data, determining, according to the prior probability information of the first uplink data and the initial log-likelihood ratio corresponding to the first uplink data, the final log-likelihood ratio corresponding to the first uplink data, and determining, according to the prior probability information of the second uplink data and the initial log-likelihood ratio corresponding to the second uplink data, the final log-likelihood ratio corresponding to the second uplink data.

Specifically, the network device may determine, according to the prior probability information of the first uplink data $m_1$, an adjustment log-likelihood ratio $LLR_{12}$ corresponding to $m_1$, and then determine, according to the initial log-likelihood ratio $LLR_1$ corresponding to $m_1$ and the adjustment log-likelihood ratio $LLR_{12}$, a final log-likelihood ratio $LLR'_1$ corresponding to $m_1$. For example, $LLR'_1=LLR_1+LLR_{12}$. Similarly, the network device may determine, according to the prior probability information of the second uplink data $m_2$, an adjustment log-likelihood ratio $LLR_{22}$ corresponding to $m_2$, and then determine, according to the initial log-likelihood ratio $LLR_2$ corresponding to $m_2$ and the adjustment log-likelihood ratio $LLR_{22}$, a final log-likelihood ratio $LLR'_2$ corresponding to $m_2$. For example, $LLR'_2=LLR_2+LLR_{22}$. This is not limited in this embodiment of the present invention.

The network device may determine the prior probability information of the first uplink data and the prior probability information of the second uplink data in multiple calculation manners. In an optional embodiment, third data is obtained by performing network coding on the first uplink data and the second uplink data. It can be learned, from log-likelihood ratio definition formula (5), that a prior probability $Pr_{ch}^{aprior}(m_1=0)$ that the first uplink data $m_1$ is 0 and a prior probability $Pr_{ch}^{aprior}(m_1=1)$ that $m_1$ is 1 are expressed using formula (6) and formula (7) respectively:

$$LLR_{m_i} = \log\left(\frac{Pr_{ch}(m_i=0)}{Pr_{ch}(m_i=1)}\right) \quad (5)$$
$$= \log\left(\frac{Pr_{ch}(m_i=0)}{1-Pr_{ch}(m_i=0)}\right),$$
$$i = 1, 2, 3,$$

where $Pr_{ch}(m_i=0)$ represents a probability that $m_i$ is 0, and $Pr_{ch}(m_i=1)$ represents a probability that $m_i$ is 1;

$$\begin{aligned} Pr_{ch}^{aprior}(m_1=0) &= Pr_{ch}(m_3=0)Pr_{ch}(m_1=0\mid m_3=0) + \\ &\quad Pr_{ch}(m_3=1)Pr_{ch}(m_1=0\mid m_3=1) \\ &= \frac{Pr_{ch}(m_3=0)Pr_{ch}(m_1=0)Pr_{ch}(m_3=0\mid m_1=0)}{Pr_{ch}(m_1=0)Pr_{ch}(m_3=0\mid m_1=0)+} + \\ &\quad Pr_{ch}(m_1=1)Pr_{ch}(m_3=0\mid m_1=1) \\ &\quad \frac{Pr_{ch}(m_3=1)Pr_{ch}(m_1=0)Pr_{ch}(m_3=1\mid m_1=0)}{Pr_{ch}(m_1=0)Pr_{ch}(m_3=1\mid m_1=0)+} \\ &\quad Pr_{ch}(m_1=1)Pr_{ch}(m_3=1\mid m_1=1) \\ &= \frac{Pr_{ch}(m_1=0)Pr_{ch}(m_2=0)Pr_{ch}(m_3=0)}{Pr_{ch}(m_1=0)Pr_{ch}(m_2=0)+} + \\ &\quad Pr_{ch}(m_1=1)Pr_{ch}(m_2=1) \\ &\quad \frac{Pr_{ch}(m_1=0)Pr_{ch}(m_2=1)Pr_{ch}(m_3=1)}{Pr_{ch}(m_1=0)Pr_{ch}(m_2=1)+} \\ &\quad Pr_{ch}(m_1=1)Pr_{ch}(m_2=0) \end{aligned} \quad (6)$$

$$\begin{aligned} Pr_{ch}^{aprior}(m_1=1) &= Pr_{ch}(m_3=0)Pr_{ch}(m_1=1\mid m_3=0) + \\ &\quad Pr_{ch}(m_3=1)Pr_{ch}(m_1=1\mid m_3=1) \\ &= \frac{Pr_{ch}(m_3=0)Pr_{ch}(m_1=1)Pr_{ch}(m_3=0\mid m_1=1)}{Pr_{ch}(m_1=1)Pr_{ch}(m_3=0\mid m_1=1)+} + \\ &\quad Pr_{ch}(m_1=0)Pr_{ch}(m_3=0\mid m_1=0) \\ &\quad \frac{Pr_{ch}(m_3=1)Pr_{ch}(m_1=1)Pr_{ch}(m_3=1\mid m_1=1)}{Pr_{ch}(m_1=0)Pr_{ch}(m_3=1\mid m_1=0)+} \\ &\quad Pr_{ch}(m_1=1)Pr_{ch}(m_3=1\mid m_1=1) \\ &= \frac{Pr_{ch}(m_1=1)Pr_{ch}(m_2=1)Pr_{ch}(m_3=0)}{Pr_{ch}(m_1=0)Pr_{ch}(m_2=0)+} + \\ &\quad Pr_{ch}(m_1=1)Pr_{ch}(m_2=1) \\ &\quad \frac{Pr_{ch}(m_1=1)Pr_{ch}(m_2=0)Pr_{ch}(m_3=1)}{Pr_{ch}(m_1=0)Pr_{ch}(m_2=1)+} \\ &\quad Pr_{ch}(m_1=1)Pr_{ch}(m_2=0) \end{aligned} \quad (7)$$

With reference to formula (6) and formula (7), it can be learned that the adjustment log-likelihood ratio corresponding to $m_1$ is expressed in formula (8):

$$LLR_{12} = \log\left(\frac{Pr_{ch}^{aprior}(m_1=0)}{Pr_{ch}^{aprior}(m_1=1)}\right) \quad (8)$$

Therefore, according to the uplink data transmission method provided in this embodiment of the present invention, a network device receives uplink data transmitted by a first terminal device and a second terminal device using a transmit diversity transmission mechanism. Specifically, the network device receives first uplink data and second uplink data that are transmitted by the first terminal device and the second terminal device respectively, obtains jointly coded data obtained by performing joint coding processing on the first uplink data and the second uplink data, and performs, according to the jointly coded data, decoding processing on the first uplink data and the second uplink data that are received. This can reduce a transmission delay while transmit diversity gains are obtained.

Figure 7:
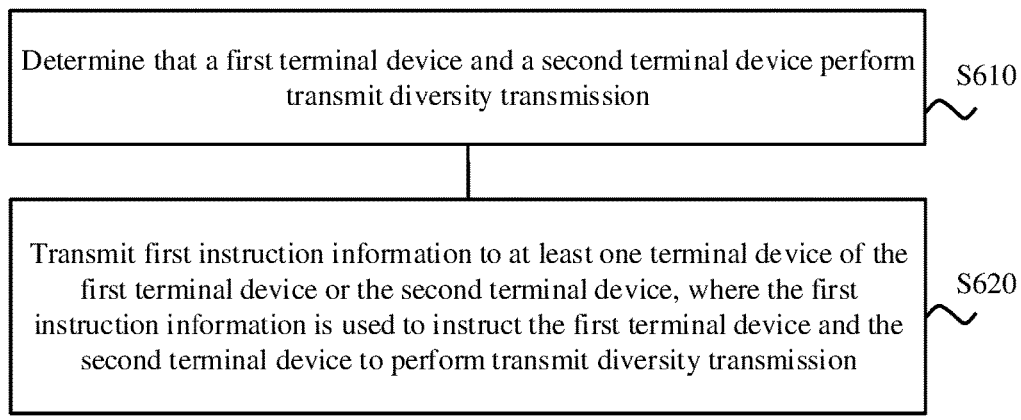
FIG. 7 is a schematic flowchart of an uplink data transmission method according to another embodiment.

FIG. 7 shows an uplink data transmission method 600 according to another embodiment of the present invention. The method 600 may be executed by a network device. As shown in FIG. 7, the method 600 includes the following steps:

S610. Determine that a first terminal device and a second terminal device perform transmit diversity transmission.

S620. Transmit first instruction information to at least one terminal device of the first terminal device or the second terminal device, where the first instruction information is used to instruct the first terminal device and the second terminal device to perform transmit diversity transmission.

Optionally, step S610 of determining that a first terminal device and a second terminal device perform transmit diversity transmission includes determining, according to transmission reliability information of the first terminal device and transmission reliability information of the second terminal device, that the first terminal device and the second terminal device perform transmit diversity transmission, where the transmission reliability information includes at least one piece of the following information: transmit diversity transmission capability information, quality information of a current uplink channel, or historical bit error rate information.

Optionally, after being connected to the network device, the first terminal device and/or the second terminal device may report their own capability information (including information about whether the first terminal device and/or the second terminal device has a transmit diversity transmission capability), or may further report whether the first terminal device and/or the second terminal device has an intention to perform transmit diversity transmission. This is not limited in this embodiment of the present invention.

Therefore, according to the uplink data transmission method provided in this embodiment of the present invention, a network device determines that a first terminal device and a second terminal device transmit uplink data using a transmit diversity transmission mechanism, and transmits first instruction information to instruct the first terminal device and the second terminal device, so that the first terminal device and the second terminal device can perform transmit diversity transmission according to the first instruction information. This can reduce a transmission delay while transmit diversity gains are obtained.

It should be understood that sequence numbers of the foregoing processes do not mean execution sequences. The execution sequences of the processes should be determined according to functions and internal logic of the processes, and should not be construed as any limitation on the implementation processes of the embodiments of the present invention.

The foregoing describes, with reference to FIG. 1 to FIG. 7, in detail the uplink data transmission methods according to the embodiments of the present invention. The following describes uplink data transmission apparatuses according to embodiments of the present invention with reference to FIG. 8 to FIG. 15.

Figure 8:
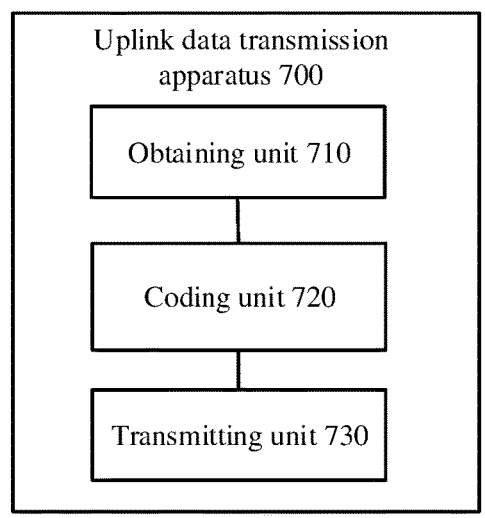
FIG. 8 is a schematic block diagram of an uplink data transmission apparatus according to an embodiment.

FIG. 8 shows an example of an uplink data transmission apparatus 700 according to an embodiment of the present invention. The apparatus 700 includes an obtaining unit 710, configured to obtain second uplink data of a second terminal device, a coding unit 720, configured to perform joint coding processing on first uplink data of a first terminal device and the second uplink data obtained by the obtaining unit 710, to obtain jointly coded data, and a transmitting unit 730, configured to transmit the first uplink data to a network device using a first transmission resource, and transmit, to the network device using a second transmission resource different from the first transmission resource, the jointly coded data obtained by the coding unit 720.

In an optional embodiment, the apparatus 700 further includes a first receiving unit, configured to: before the obtaining unit 710 obtains the second uplink data of the second terminal device, receive first instruction information transmitted by the network device, where the first instruction information is used to instruct the first terminal device and the second terminal device to perform transmit diversity transmission, and a first determining unit, configured to determine, according to the first instruction information received by the first receiving unit, to perform transmit diversity transmission with the second terminal device.

In this case, the apparatus may obtain the second uplink data of the second terminal device after determining to perform transmit diversity transmission with the second terminal device, or may obtain the second uplink data when determining to perform transmit diversity transmission with the second terminal device. This is not limited in this embodiment of the present invention.

Optionally, the first instruction information may be further used to instruct the first terminal device to transmit the jointly coded data, that is, the first terminal device transmits the second uplink data of the second terminal device. This is not limited in this embodiment of the present invention.

Optionally, the first instruction information includes group identifier information of a terminal device group to which the second terminal device belongs and number information of the second terminal device in the terminal device group.

In another optional embodiment, the transmitting unit 730 is further configured to: before the obtaining unit 710 obtains the second uplink data of the second terminal device, transmit a transmit diversity transmission request to at least one terminal device including the second terminal device. The transmit diversity transmission request is used to request to perform transmit diversity transmission with the first terminal device.

Correspondingly, the apparatus 700 further includes:

a second receiving unit, configured to receive a transmit diversity transmission response transmitted by the second terminal device according to the transmit diversity transmission request transmitted by the transmitting unit 730; and a second determining unit, configured to determine, according to the transmit diversity transmission response received by the second receiving unit, to perform transmit diversity transmission with the second terminal device.

Optionally, the transmitting unit 730 is further configured to transmit second instruction information to the network device. The second instruction information is used to instruct the first terminal device and the second terminal device to perform transmit diversity transmission.

The second instruction information may explicitly or implicitly instruct the first terminal device and the second terminal device to perform transmit diversity transmission.

In an optional embodiment, the apparatus 700 further includes:

a check code addition unit, configured to: add a CRC code to the first uplink data before the transmitting unit 730 transmits the first uplink data to the network device using the first transmission resource, where the CRC code is scrambled using an identifier of the second terminal device.

Correspondingly, the transmitting unit 730 is specifically configured to transmit, to the network device using the first transmission resource, the first uplink data to which the CRC code is added by the check code addition unit.

Alternatively, the first terminal device may scramble, using the identifier of the second terminal device, a CRC code corresponding to the jointly coded data. This is not limited in this embodiment of the present invention.

In an optional embodiment, the obtaining unit 710 is specifically configured to: receive, by means of D2D transmission, the second uplink data transmitted by the second terminal device.

In another optional embodiment, the transmitting unit 730 is specifically configured to transmit the first uplink data and the jointly coded data to the network device in a grant-free transmission manner.

Optionally, the first transmission resource is specifically a first CTU, the second transmission resource is specifically a second CTU, and the first CTU and the second CTU are located in different contention access regions.

In another optional embodiment, the obtaining unit 710 is further configured to: before the transmitting unit 730 transmits the jointly coded data to the network device using the second transmission resource different from the first transmission resource, obtain information about a third transmission resource used by the second terminal device to transmit the second uplink data.

Correspondingly, the apparatus further includes a third determining unit, configured to determine, according to the first transmission resource and the information about the third transmission resource obtained by the obtaining unit 710, the second transmission resource used to transmit the jointly coded data.

The transmitting unit 730 is specifically configured to transmit the jointly coded data to the network device using the second transmission resource determined by the third determining unit.

In another optional embodiment, if the second transmission resource is specifically the second CTU, an index number $\text{Indx}_{CTU}$ of the second CTU is determined using the following formula:

$$\text{Indx}_{CTU} = (\text{Sig}_1 + \text{Sig}_2) \bmod N_{CTU} \qquad (9),$$

where $\text{Sig}_1$ is an index of a code resource included in the first transmission resource, $\text{Sig}_2$ is an index of a code resource included in the third transmission resource, and $N_{CTU}$ is a quantity of CTUs included in a current subframe.

Optionally, the code resource comprised in the first or the third transmission resource includes one of the following: a sparse code multiple access codebook, a low density signature sequence, or a Code Division Multiple Access code.

The uplink data transmission apparatus 700 in this embodiment of the present invention may be corresponding to the first terminal device in the uplink data transmission methods in the embodiments of the present invention, and the foregoing operations and/or functions and other operations and/or functions of all modules of the uplink data transmission apparatus 700 are used for implementing corresponding procedures of all methods in FIG. 3 respectively. For simplicity, no details are repeated herein.

Therefore, according to the uplink data transmission apparatus provided in this embodiment of the present invention, a first terminal device and a second terminal device transmit uplink data using a transmit diversity transmission mechanism, and the first terminal device obtains second uplink data of the second terminal device, performs joint coding processing on to-be-transmitted first uplink data and the second uplink data to obtain jointly coded data, and transmits the first uplink data and the jointly coded data to a network device using different transmission resources. This can reduce a transmission delay while transmit diversity gains are obtained.

Figure 9:
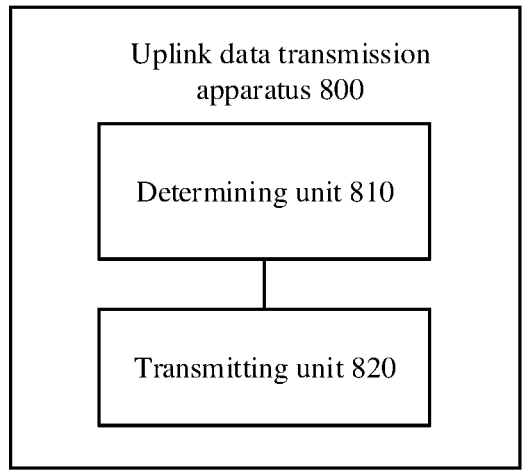
FIG. 9 is a schematic block diagram of an uplink data transmission apparatus according to another embodiment.

FIG. 9 shows another uplink data transmission apparatus 800 according to an embodiment of the present invention. The apparatus 800 includes a determining unit 810, configured to determine to-be-transmitted uplink data and a transmission resource for the uplink data, and a transmitting unit 820, configured to transmit the uplink data determined by the determining unit 810 and information about the transmission resource to a first terminal device; and transmit the uplink data to a network device using the transmission resource determined by the determining unit 810.

Optionally, the transmitting unit 820 may transmit the uplink data to the network device in a grant-free transmission manner.

In an optional embodiment, the apparatus 800 further includes: a first receiving unit, configured to, before the transmitting unit 820 transmits the uplink data and the information about the transmission resource to the first terminal device, receive first instruction information transmitted by the network device. The first instruction information is used to instruct the first terminal device and a second terminal device to perform transmit diversity transmission.

Correspondingly, the determining unit 810 is further configured to determine, according to the first instruction information received by the first receiving unit, to perform transmit diversity transmission with the first terminal device.

Optionally, the first instruction information includes group identifier information of a terminal device group to which the first terminal device belongs and number information of the first terminal device in the terminal device group.

In another optional embodiment, the apparatus 800 further includes: a second receiving unit, configured to: before the transmitting unit 820 transmits the uplink data and the information about the transmission resource to the first terminal device, receive a transmit diversity transmission request transmitted by the first terminal device. The transmit diversity transmission request is used to request to perform transmit diversity transmission with the first terminal device.

Correspondingly, the determining unit 810 is further configured to determine, according to the transmit diversity transmission request received by the second receiving unit, to perform transmit diversity transmission with the first terminal device.

The transmitting unit 820 is further configured to transmit a transmit diversity transmission response to the first terminal device.

Alternatively, the second terminal device may initiate transmit diversity transmission. This is not limited in this embodiment of the present invention.

Optionally, the transmitting unit 820 is further configured to transmit second instruction information to the network device. The second instruction information is used to instruct the first terminal device and the second terminal device to perform transmit diversity transmission.

In an optional embodiment, the apparatus 800 further includes: a check code addition unit, configured to add a cyclic redundancy check CRC code to the uplink data before the transmitting unit 820 transmits the uplink data to the network device using the transmission resource. The CRC code is scrambled using an identifier of the first terminal device.

Correspondingly, the transmitting unit 820 is specifically configured to transmit, to the network device using the transmission resource, the uplink data to which the CRC code is added by the check code addition unit.

In this case, it may be implicitly indicated that the uplink data and uplink data of the first terminal device are transmitted in a diversity transmission manner. This is not limited in this embodiment of the present invention.

In an optional embodiment, the transmitting unit 820 is specifically configured to transmit the uplink data and the information about the transmission resource to the first terminal device by means of D2D transmission.

Optionally, the information about the transmission resource may include at least one piece of the following information: a CTU index, a code resource index, the identifier of the second terminal device, or a pilot index.

In an optional embodiment, the information about the transmission resource may include information about a code resource, and the code resource includes one of the following: a sparse code multiple access codebook, a low density signature sequence, or a Code Division Multiple Access code.

The uplink data transmission apparatus 800 in this embodiment of the present invention may be corresponding to the second terminal device in the uplink data transmission methods in the embodiments of the present invention, and the foregoing operations and/or functions and other operations and/or functions of all modules of the uplink data transmission apparatus 800 are used for implementing corresponding procedures of all methods in FIG. 5 respectively. For simplicity, no details are repeated herein.

Therefore, according to the uplink data transmission apparatus provided in this embodiment of the present invention, a first terminal device and a second terminal device transmit uplink data using a transmit diversity transmission mechanism. The second terminal device transmits to-be-transmitted uplink data and information about a transmission resource for the uplink data to the first terminal device, so that the first terminal device performs joint coding processing on the to-be-transmitted first uplink data and the received uplink data transmitted by the second terminal device, to obtain jointly coded data; and transmits the first uplink data and the jointly coded data to a network device using different transmission resources. The second terminal device transmits the uplink data to the network device. This can reduce a transmission delay while transmit diversity gains are obtained.

Figure 10:
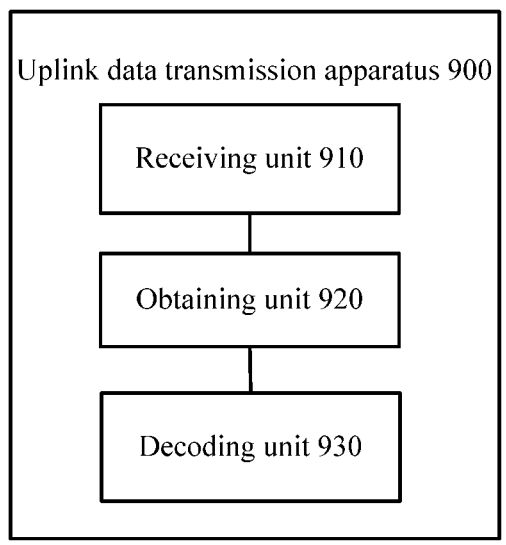
FIG. 10 is a schematic block diagram of an uplink data transmission apparatus according to another embodiment.

FIG. 10 shows another uplink data transmission apparatus 900 according to an embodiment of the present invention. The apparatus 900 includes a receiving unit 910, configured to receive first uplink data transmitted by a first terminal device using a first transmission resource, and second uplink data transmitted by a second terminal device using a third transmission resource, an obtaining unit 920, configured to obtain jointly coded data transmitted by the first terminal device using a second transmission resource different from the first transmission resource, where the jointly coded data is obtained by performing joint coding processing on the first uplink data and the second uplink data that are received by the receiving unit 910, and a decoding unit 930, configured to obtain, according to the jointly coded data obtained by the obtaining unit 920 and the first uplink data and the second uplink data that are received by the receiving unit 910, a decoding result of the first uplink data and a decoding result of the second uplink data.

In an optional embodiment, the apparatus 900 further includes a first determining unit, configured to: before the receiving unit 910 receives the first uplink data transmitted by the first terminal device using the first transmission resource, and the second uplink data transmitted by the second terminal device using the third transmission resource, determine that the first terminal device and the second terminal device perform transmit diversity transmission, and a transmitting unit, configured to transmit first instruction information to at least one terminal device of the first terminal device or the second terminal device, where the first instruction information is used to indicate that, as determined by the first determining unit, the first terminal device and the second terminal device perform transmit diversity transmission.

Optionally, the first determining unit is specifically configured to determine, according to transmission reliability information of the first terminal device and transmission reliability information of the second terminal device, that the first terminal device and the second terminal device perform transmit diversity transmission. The transmission reliability information includes at least one piece of the following information: transmit diversity transmission capability information, quality information of a current uplink channel, or historical bit error rate information.

In another optional embodiment, the receiving unit 910 is further configured to: before the receiving first uplink data transmitted by a first terminal device using a first transmission resource, and second uplink data transmitted by a second terminal device using a third transmission resource, receive second instruction information transmitted by at least one terminal device of the first terminal device or the second terminal device. The second instruction information is used to instruct the first terminal device and the second terminal device to perform transmit diversity transmission.

In this case, the apparatus may determine, according to the second instruction information, that the first uplink data and the second uplink data are transmitted in a transmit diversity manner, and obtain jointly coded data corresponding to the first uplink data and the second uplink data.

Optionally, the receiving unit 910 is specifically configured to receive the first uplink data and the second uplink data that are transmitted in a grant-free transmission manner by the first terminal device and the second terminal device respectively.

In an optional embodiment, the first transmission resource is specifically a first CTU, the second transmission resource is a specifically a second CTU, the third transmission resource is specifically a third CTU that is different from the first CTU and the second CTU, and the third CTU is located in a contention access region different from that of the first CTU and that of the second CTU.

In an optional embodiment, the decoding unit 930 is specifically configured to perform demodulation processing on the received first uplink data to obtain an initial log-likelihood ratio corresponding to the first uplink data, perform demodulation processing on the received second uplink data to obtain an initial log-likelihood ratio corresponding to the second uplink data, perform demodulation processing on the jointly coded data obtained to obtain a log-likelihood ratio corresponding to the jointly coded data, determine, according to the log-likelihood ratio corresponding to the jointly coded data, the initial log-likelihood ratio corresponding to the first uplink data, and the initial log-likelihood ratio corresponding to the second uplink data, a final log-likelihood ratio corresponding to the first uplink data and a final log-likelihood ratio corresponding to the second uplink data, and perform decoding processing on the final log-likelihood ratio corresponding to the first uplink data, to obtain the decoding result of the first uplink data, and perform decoding processing on the final log-likelihood ratio corresponding to the second uplink data, to obtain the decoding result of the second uplink data.

Optionally, the decoding unit 930 is specifically configured to determine, according to the log-likelihood ratio corresponding to the jointly coded data, the initial log-likelihood ratio corresponding to the first uplink data, and the initial log-likelihood ratio corresponding to the second uplink data, prior probability information of the first uplink data and prior probability information of the second uplink data, determine, according to the prior probability information of the first uplink data and the initial log-likelihood ratio corresponding to the first uplink data, the final log-likelihood ratio corresponding to the first uplink data, and determine, according to the prior probability information of the second uplink data and the initial log-likelihood ratio corresponding to the second uplink data, the final log-likelihood ratio corresponding to the second uplink data.

In another optional embodiment, the obtaining unit 920 is specifically configured to obtain information about the first transmission resource and information about the third transmission resource, determine the second transmission resource according to the information about the first transmission resource and the information about the third transmission resource, and obtain the jointly coded data transmitted using the second transmission resource.

In another optional embodiment, if the second transmission resource is specifically the second CTU, an index $\text{Indx}_{CTU}$ of the second CTU is determined using the following formula:

$$\text{Indx}_{CTU}=(\text{Sig}_1+\text{Sig}_2)\bmod N_{CTU} \qquad (10),$$

where $\text{Sig}_1$ is an index of a code resource included in the first transmission resource, $\text{Sig}_2$ is an index of a code resource included in the third transmission resource, and $N_{CTU}$ is a quantity of CTUs included in a current subframe.

The uplink data transmission apparatus 900 in this embodiment of the present invention may be corresponding to the network device in the uplink data transmission methods in the embodiments of the present invention, and the foregoing operations and/or functions and other operations and/or functions of all modules of the uplink data transmission apparatus 900 are used for implementing corresponding procedures of all methods in FIG. 6 respectively. For simplicity, no details are repeated herein.

Therefore, according to the uplink data transmission apparatus provided in this embodiment of the present invention, a network device receives uplink data transmitted by a first terminal device and a second terminal device using a transmit diversity transmission mechanism. Specifically, the network device receives first uplink data and second uplink data that are transmitted by the first terminal device and the second terminal device respectively, obtains jointly coded data obtained by performing joint coding processing on the first uplink data and the second uplink data, and performs, according to the jointly coded data, decoding processing on the first uplink data and the second uplink data that are received. This can reduce a transmission delay while transmit diversity gains are obtained.

Figure 11:
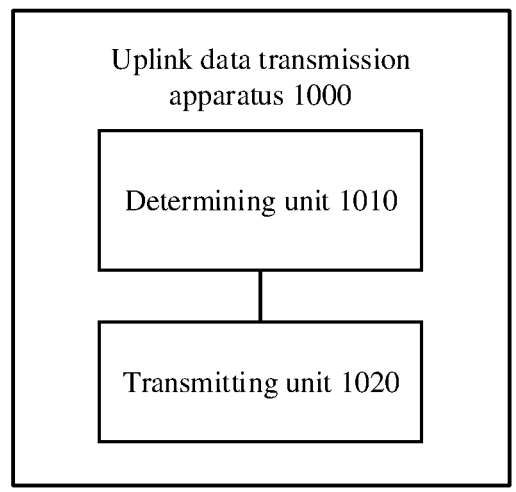
FIG. 11 is a schematic block diagram of an uplink data transmission apparatus according to another embodiment.

FIG. 11 shows another uplink data transmission apparatus 1000 according to an embodiment of the present invention. The apparatus 1000 includes a determining unit 1010, configured to determine that a first terminal device and a second terminal device perform transmit diversity transmission, a transmitting unit 1020, configured to transmit first instruction information to at least one terminal device of the first terminal device or the second terminal device, where the first instruction information is used to indicate that, as determined by the determining unit 1010, the first terminal device and the second terminal device perform transmit diversity transmission.

Optionally, the determining unit 1010 is specifically configured to determine, according to transmission reliability information of the first terminal device and transmission reliability information of the second terminal device, that the first terminal device and the second terminal device perform transmit diversity transmission. The transmission reliability information includes at least one piece of the following information: transmit diversity transmission capability information, quality information of a current uplink channel, or historical bit error rate information.

The uplink data transmission apparatus 1000 in this embodiment of the present invention may be corresponding to the network device in the uplink data transmission methods in the embodiments of the present invention, and the foregoing operations and/or functions and other operations and/or functions of all modules of the uplink data transmission apparatus 1000 are used for implementing corresponding procedures of all methods in FIG. 7 respectively. For simplicity, no details are repeated herein.

Therefore, according to the uplink data transmission apparatus provided in this embodiment of the present invention, a network device determines that a first terminal device and a second terminal device transmit uplink data using a transmit diversity transmission mechanism, and transmits first instruction information to instruct the first terminal device and the second terminal device, so that the first terminal device and the second terminal device can perform transmit diversity transmission according to the first instruction information. This can reduce a transmission delay while transmit diversity gains are obtained.

Figure 12:
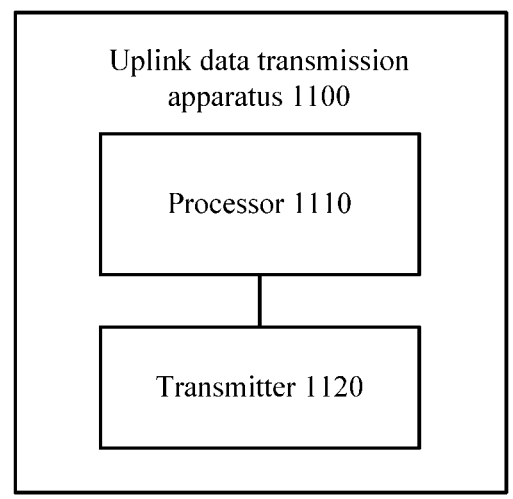
FIG. 12 is a schematic block diagram of an uplink data transmission apparatus according to another embodiment.

FIG. 12 shows an example of an uplink data transmission apparatus 1100 according to an embodiment of the present invention. The apparatus 1100 includes a processor 1110, configured to, according to instructions on a non-transitory computer readable medium, obtain second uplink data of a second terminal device, and perform joint coding processing on first uplink data of a first terminal device and the obtained second uplink data to obtain jointly coded data, and a transmitter 1120, configured to transmit the first uplink data to a network device using a first transmission resource, and transmit, to the network device using a second transmission resource different from the first transmission resource, the jointly coded data obtained by the processor 1110.

In an optional embodiment, the apparatus 1100 further includes a receiver, configured to, before the processor 1110 obtains the second uplink data of the second terminal device, receive first instruction information transmitted by the network device. The first instruction information is used to instruct the first terminal device and the second terminal device to perform transmit diversity transmission.

Correspondingly, the processor 1110 is further configured to determine, according to the first instruction information received by the receiver, to perform transmit diversity transmission with the second terminal device.

In this case, the apparatus may obtain the second uplink data of the second terminal device after determining to perform transmit diversity transmission with the second terminal device, or may obtain the second uplink data when determining to perform transmit diversity transmission with the second terminal device. This is not limited in this embodiment of the present invention.

Optionally, the first instruction information may be further used to instruct the first terminal device to transmit the jointly coded data, that is, the first terminal device assists in transmitting the second uplink data of the second terminal device. This is not limited in this embodiment of the present invention.

Optionally, the first instruction information includes group identifier information of a terminal device group to which the second terminal device belongs and number information of the second terminal device in the terminal device group.

In another optional embodiment, the transmitter 1120 is further configured to: before the processor 1110 obtains the second uplink data of the second terminal device, transmit a transmit diversity transmission request to at least one terminal device including the second terminal device. The transmit diversity transmission request is used to request to perform transmit diversity transmission with the first terminal device.

In this case, the apparatus 1100 further includes a receiver, configured to receive a transmit diversity transmission response transmitted by the second terminal device according to the transmit diversity transmission request transmitted by the transmitter 1120.

Correspondingly, the processor 1110 is further configured to determine, according to the transmit diversity transmission response received by the receiver, to perform transmit diversity transmission with the second terminal device.

Optionally, the transmitter 1120 is further configured to transmit second instruction information to the network device. The second instruction information is used to instruct the first terminal device and the second terminal device to perform transmit diversity transmission.

The second instruction information may explicitly or implicitly instruct the first terminal device and the second terminal device to perform transmit diversity transmission. In an optional embodiment, the processor 1110 is further configured to: add a CRC code to the first uplink data before the transmitter 1120 transmits the first uplink data to the network device using the first transmission resource. The CRC code is scrambled using an identifier of the second terminal device.

Correspondingly, the transmitter 1120 is specifically configured to transmit, to the network device using the first transmission resource, the first uplink data to which the CRC code is added by the processor 1110.

Alternatively, the first terminal device may scramble, using the identifier of the second terminal device, a CRC code corresponding to the jointly coded data. This is not limited in this embodiment of the present invention.

In an optional embodiment, the processor 1110 is specifically configured to: receive, by means of D2D transmission, the second uplink data transmitted by the second terminal device.

In another optional embodiment, the transmitter 1120 is specifically configured to transmit the first uplink data and the jointly coded data to the network device in a grant-free transmission manner.

Optionally, the first transmission resource is specifically a first CTU, the second transmission resource is specifically a second CTU, and the first CTU and the second CTU are located in different contention access regions.

In another optional embodiment, the processor 1110 is further configured to: before the transmitter 1120 transmits the jointly coded data to the network device using the second transmission resource different from the first transmission resource, obtain information about a third transmission resource used by the second terminal device to transmit the second uplink data; and determine, according to the obtained information about the third transmission resource and the first transmission resource, the second transmission resource used to transmit the jointly coded data.

In another optional embodiment, if the second transmission resource is specifically the second CTU, an index number $\text{Indx}_{CTU}$ of the second CTU is determined using the following formula:

$$\text{Indx}_{CTU} = (\text{Sig}_1 + \text{Sig}_2) \bmod N_{CTU} \qquad (11),$$

where $\text{Sig}_1$ is an index of a code resource included in the first transmission resource, $\text{Sig}_2$ is an index of a code resource included in the third transmission resource, and $N_{CTU}$ is a quantity of CTUs included in a current subframe.

Optionally, the code resource comprised in the first or the third transmission resource includes one of the following: a sparse code multiple access codebook, a low density signature sequence, or a Code Division Multiple Access code.

The uplink data transmission apparatus 1100 in this embodiment of the present invention may be corresponding to the first terminal device in the uplink data transmission methods in the embodiments of the present invention, and the foregoing operations and/or functions and other operations and/or functions of all modules of the uplink data transmission apparatus 1100 are used for implementing corresponding procedures of all methods in FIG. 3 respectively. For simplicity, no details are repeated herein.

Therefore, according to the uplink data transmission apparatus provided in this embodiment of the present invention, a first terminal device and a second terminal device transmit uplink data using a transmit diversity transmission mechanism, and the first terminal device obtains second uplink data of the second terminal device, performs joint coding processing on to-be-transmitted first uplink data and the second uplink data to obtain jointly coded data, and transmits the first uplink data and the jointly coded data to a network device using different transmission resources. This can reduce a transmission delay while transmit diversity gains are obtained.

Figure 13:
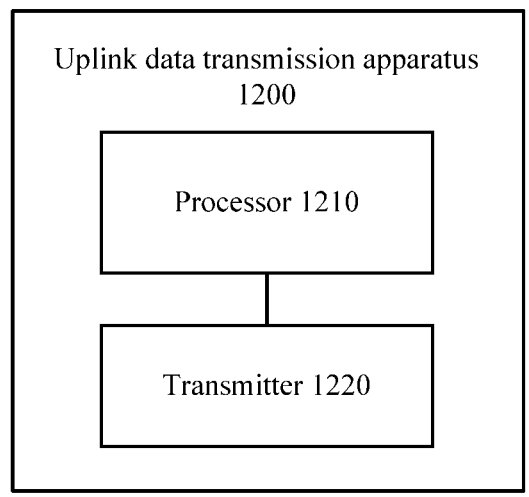
FIG. 13 is a schematic block diagram of an uplink data transmission apparatus according to another embodiment.

FIG. 13 shows another uplink data transmission apparatus 1200 according to an embodiment of the present invention. The apparatus 1200 includes a processor 1210, configured to determine to perform transmit diversity transmission with a first terminal device, and a transmitter 1220, configured to transmit uplink data and information about a transmission resource that are determined by the processor 1210 to the first terminal device; and transmit the uplink data to a network device using the transmission resource determined by the processor 1210.

Optionally, the transmitter 1220 may transmit the uplink data to the network device in a grant-free transmission manner.

In an optional embodiment, the apparatus 1200 further includes: a receiver, configured to: before the transmitter 1220 transmits the uplink data and the information about the transmission resource to the first terminal device, receive first instruction information transmitted by the network device. The first instruction information is used to instruct the first terminal device and a second terminal device to perform transmit diversity transmission.

Correspondingly, the processor 1210 is further configured to determine, according to the first instruction information received by the receiver, to perform transmit diversity transmission with the first terminal device.

Optionally, the first instruction information includes group identifier information of a terminal device group to which the first terminal device belongs and number information of the first terminal device in the terminal device group.

In another optional embodiment, the apparatus 1200 further includes a receiver, configured to, before the transmitter 1220 transmits the uplink data and the information about the transmission resource to the first terminal device, receive a transmit diversity transmission request transmitted by the first terminal device. The transmit diversity transmission request is used to request to perform transmit diversity transmission with the first terminal device.

Correspondingly, the processor 1210 is further configured to determine, according to the transmit diversity transmission request received by the receiver, to perform transmit diversity transmission with the first terminal device.

The transmitter 1220 is further configured to transmit a transmit diversity transmission response to the first terminal device.

Alternatively, the second terminal device may initiate the transmit diversity transmission. This is not limited in this embodiment of the present invention.

Optionally, the transmitter 1220 is further configured to transmit second instruction information to the network device. The second instruction information is used to instruct the first terminal device and the second terminal device to perform transmit diversity transmission.

In an optional embodiment, the processor 1210 is further configured to: add a CRC code to the uplink data before the transmitter 1220 transmits the uplink data to the network device using the transmission resource. The CRC code is scrambled using an identifier of the first terminal device.

Correspondingly, the transmitter 1220 is specifically configured to transmit, to the network device using the transmission resource, the uplink data to which the CRC code is added by the processor 1210.

In this case, it may be implicitly indicated that the uplink data and uplink data of the first terminal device are transmitted in a diversity transmission manner. This is not limited in this embodiment of the present invention.

In an optional embodiment, the transmitter 1220 is specifically configured to transmit the uplink data and the information about the transmission resource to the first terminal device by means of D2D transmission.

Optionally, the information about the transmission resource may include at least one piece of the following information: a CTU index, a code resource index, the identifier of the second terminal device, or a pilot index.

In an optional embodiment, the information about the transmission resource may include information about a code resource, and the code resource includes one of the following: a sparse code multiple access codebook, a low density signature sequence, or a Code Division Multiple Access code.

The uplink data transmission apparatus 1200 in this embodiment of the present invention may be corresponding to the second terminal device in the uplink data transmission methods in the embodiments of the present invention, and the foregoing operations and/or functions and other operations and/or functions of all modules of the uplink data transmission apparatus 1200 are used for implementing corresponding procedures of all methods in FIG. 5 respectively. For simplicity, no details are repeated herein.

Therefore, according to the uplink data transmission apparatus provided in this embodiment of the present invention, a first terminal device and a second terminal device transmit uplink data using a transmit diversity transmission mechanism. The second terminal device transmits second uplink data and information about a transmission resource to the first terminal device, so that the first terminal device performs joint coding processing on to-be-transmitted first uplink data and the received second uplink data transmitted by the second terminal device, to obtain jointly coded data; and transmits the first uplink data and the jointly coded data to a network device using different transmission resources. The second terminal device transmits the second uplink data to the network device. This can reduce a transmission delay while transmit diversity gains are obtained.

Figure 14:
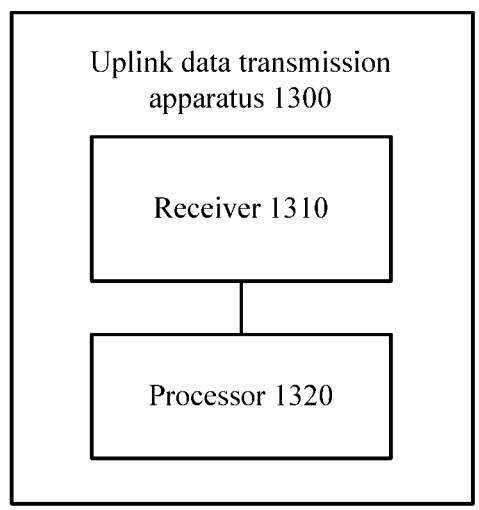
FIG. 14 is a schematic block diagram of an uplink data transmission apparatus according to another embodiment.

FIG. 14 shows another uplink data transmission apparatus 1300 according to an embodiment of the present invention. The apparatus 1300 includes a receiver 1310, configured to receive first uplink data transmitted by a first terminal device using a first transmission resource, and second uplink data transmitted by a second terminal device using a third transmission resource and a processor 1320, configured to, according to instructions on a non-transitory computer readable medium, obtain jointly coded data transmitted by the first terminal device using a second transmission resource different from the first transmission resource, where the jointly coded data is obtained by performing joint coding processing on the first uplink data and the second uplink data that are received by the receiver 1310; and obtain, according to the jointly coded data obtained, the first uplink data, and the second uplink data, a decoding result of the first uplink data and a decoding result of the second uplink data.

In an optional embodiment, the processor 1320 is further configured to: before the receiver 1310 receives the first uplink data transmitted by the first terminal device using the first transmission resource, and the second uplink data transmitted by the second terminal device using the third transmission resource, determine that the first terminal device and the second terminal device perform transmit diversity transmission.

Correspondingly, the apparatus 1300 further includes a transmitter, configured to transmit first instruction information to at least one terminal device of the first terminal device or the second terminal device. The first instruction information is used to indicate that, as determined by the processor 1320, the first terminal device and the second terminal device perform transmit diversity transmission.

Optionally, the processor 1320 is specifically configured to determine, according to transmission reliability information of the first terminal device and transmission reliability information of the second terminal device, that the first terminal device and the second terminal device perform transmit diversity transmission. The transmission reliability information includes at least one piece of the following information: transmit diversity transmission capability information, quality information of a current uplink channel, or historical bit error rate information.

In another optional embodiment, the receiver 1310 is further configured to, before the receiving first uplink data transmitted by a first terminal device using a first transmission resource, and second uplink data transmitted by a second terminal device using a third transmission resource, receive second instruction information transmitted by at least one terminal device of the first terminal device or the second terminal device. The second instruction information is used to instruct the first terminal device and the second terminal device to perform transmit diversity transmission.

In this case, the apparatus may determine, according to the second instruction information, that the first uplink data and the second uplink data are transmitted in a transmit diversity manner, and obtain jointly coded data corresponding to the first uplink data and the second uplink data.

In an optional embodiment, the receiver 1310 is specifically configured to receive the first uplink data and the second uplink data that are transmitted in a grant-free transmission manner by the first terminal device and the second terminal device respectively.

Optionally, the first transmission resource is specifically a first CTU, the second transmission resource is a specifically a second CTU, the third transmission resource is specifically a third CTU that is different from the first CTU and the second CTU, and the third CTU is located in a contention access region different from that of the first CTU and that of the second CTU.

In an optional embodiment, the processor 1320 is specifically configured to perform demodulation processing on the received first uplink data to obtain an initial log-likelihood ratio corresponding to the first uplink data, perform demodulation processing on the received second uplink data to obtain an initial log-likelihood ratio corresponding to the second uplink data, perform demodulation processing on the jointly coded data obtained to obtain a log-likelihood ratio corresponding to the jointly coded data, determine, according to the log-likelihood ratio corresponding to the jointly coded data, the initial log-likelihood ratio corresponding to the first uplink data, and the initial log-likelihood ratio corresponding to the second uplink data, a final log-likelihood ratio corresponding to the first uplink data and a final log-likelihood ratio corresponding to the second uplink data, and perform decoding processing on the final log-likelihood ratio corresponding to the first uplink data, to obtain the decoding result of the first uplink data, and perform decoding processing on the final log-likelihood ratio corresponding to the second uplink data, to obtain the decoding result of the second uplink data.

Optionally, the processor 1320 is specifically configured to determine, according to the log-likelihood ratio corresponding to the jointly coded data, the initial log-likelihood ratio corresponding to the first uplink data, and the initial log-likelihood ratio corresponding to the second uplink data, prior probability information of the first uplink data and prior probability information of the second uplink data, determine, according to the prior probability information of the first uplink data and the initial log-likelihood ratio corresponding to the first uplink data, the final log-likelihood ratio corresponding to the first uplink data, and determine, according to the prior probability information of the second uplink data and the initial log-likelihood ratio corresponding to the second uplink data, the final log-likelihood ratio corresponding to the second uplink data.

In another optional embodiment, the processor 1320 is specifically configured to obtain information about the first transmission resource and information about the third transmission resource, determine the second transmission resource according to the information about the first transmission resource and the information about the third transmission resource, and obtain the jointly coded data transmitted using the second transmission resource.

In another optional embodiment, if the second transmission resource is specifically the second CTU, an index $\text{Indx}_{CTU}$ of the second CTU is determined using the following formula:

$$\text{Indx}_{CTU} = (\text{Sig}_1 + \text{Sig}_2) \bmod N_{CTU} \quad (12),$$

where $\text{Sig}_1$ is an index of a code resource included in the first transmission resource, $\text{Sig}_2$ is an index of a code resource included in the third transmission resource, and $N_{CTU}$ is a quantity of CTUs included in a current subframe.

The uplink data transmission apparatus 1300 in this embodiment of the present invention may be corresponding to the network device in the uplink data transmission methods in the embodiments of the present invention, and the foregoing operations and/or functions and other operations and/or functions of all modules of the uplink data transmission apparatus 1300 are used for implementing corresponding procedures of all methods in FIG. 6 respectively. For simplicity, no details are repeated herein.

Therefore, according to the uplink data transmission apparatus provided in this embodiment of the present invention, a network device receives uplink data transmitted by a first terminal device and a second terminal device using a transmit diversity transmission mechanism. Specifically, the network device receives first uplink data and second uplink data that are transmitted by the first terminal device and the second terminal device respectively, obtains jointly coded data obtained by performing joint coding processing on the first uplink data and the second uplink data, and performs, according to the jointly coded data, decoding processing on the first uplink data and the second uplink data that are received. This can reduce a transmission delay while transmit diversity gains are obtained.

Figure 15:
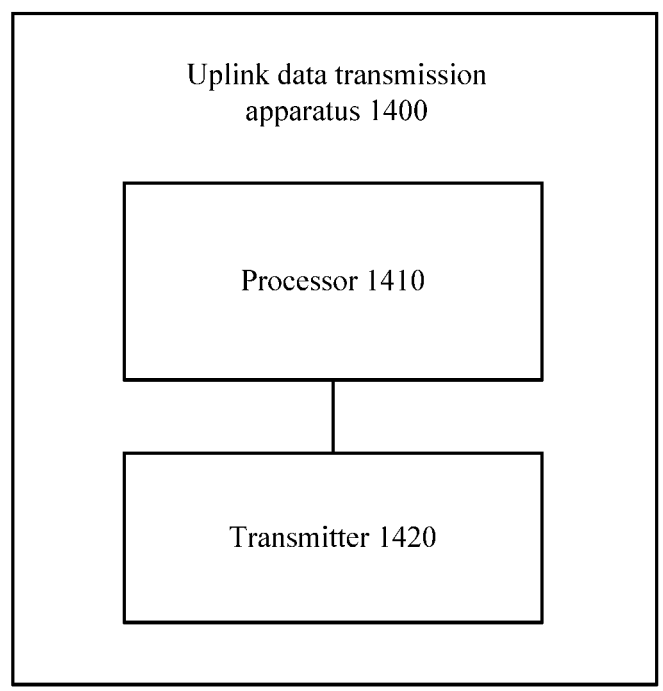
FIG. 15 is a schematic block diagram of an uplink data transmission apparatus according to another embodiment.

FIG. 15 shows another uplink data transmission apparatus 1400 according to an embodiment of the present invention. The apparatus 1400 includes a processor 1410, configured to, according to instructions on a non-transitory computer readable medium, determine that a first terminal device and a second terminal device perform transmit diversity transmission, and a transmitter 1420, configured to transmit first instruction information to at least one terminal device of the first terminal device or the second terminal device, where the first instruction information is used to indicate that, as determined by the processor 1410, the first terminal device and the second terminal device perform transmit diversity transmission.

Optionally, the processor 1410 is specifically configured to determine, according to transmission reliability information of the first terminal device and transmission reliability information of the second terminal device, that the first terminal device and the second terminal device perform transmit diversity transmission. The transmission reliability information includes at least one piece of the following information: transmit diversity transmission capability information, quality information of a current uplink channel, or historical bit error rate information.

The uplink data transmission apparatus 1400 in this embodiment of the present invention may be corresponding to the network device in the uplink data transmission methods in the embodiments of the present invention, and the foregoing operations and/or functions and other operations and/or functions of all modules of the uplink data transmission apparatus 1400 are used for implementing corresponding procedures of all methods in FIG. 7 respectively. For simplicity, no details are repeated herein.

Therefore, according to the uplink data transmission apparatus provided in this embodiment of the present invention, a network device determines that a first terminal device and a second terminal device transmit uplink data using a transmit diversity transmission mechanism, and transmits first instruction information to instruct the first terminal device and the second terminal device, so that the first terminal device and the second terminal device can perform transmit diversity transmission according to the first instruction information. This can reduce a transmission delay while transmit diversity gains are obtained.

It should be understood that in this embodiment of the present invention, the processor of the apparatus may be a central processing unit (CPU), the processor may be further another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

Optionally, the apparatus may further include a memory. The memory may include a read-only memory and a random access memory, and may be a non-transitory computer readable medium, and provides instructions and data to the processor. A part of the memory may further include a non-volatile random access memory. For example, the memory may further store information about a device type.

In an implementation process, all steps of the foregoing methods may be completed using an integrated logic circuit of hardware in the processor or using an instruction in a software form. The steps of the methods disclosed with reference to this embodiment of the present invention may be executed and completed by a hardware processor, or may be executed and completed using a combination of hardware and software modules in a processor. The software module may be located in a storage medium mature in the art such as a random access memory, a flash memory, a read-only memory, a programmable read-only memory, an electrically erasable programmable memory, or a register. The storage medium is located in the memory. The processor reads an instruction in the memory and completes steps of the foregoing method with reference to hardware of the processor. To avoid repetition, no details are repeated herein.

It should be further understood that descriptions provided for all the foregoing embodiments in this specification focus on a difference between all the embodiments, and for the rest, reference may be made to each other. It can be understood that technical features and descriptions of one of the foregoing embodiments are applicable to another embodiment. For example, technical features of a method embodiment may be applicable to an apparatus embodiment or another method embodiment, and are not repeated one by one in the another embodiment.

It should be further understood that the transmitting unit or transmitter in the foregoing embodiments may transmit information over an air interface, or may not transmit information over an air interface, but transmit information to another device so that the another device transmits information over an air interface. The receiving unit or receiver in the foregoing embodiments may receive information over an air interface, or may not receive information over an air interface, but receive information using another device that receives over an air interface.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and no details are described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   obtaining, by a first terminal device, second uplink data of a second terminal device;
   performing, by the first terminal device, joint coding processing on first uplink data of the first terminal device and on the second uplink data, wherein the performing the joint coding processing generates jointly coded data that is based on the first uplink data and the second uplink data; and
   transmitting, by the first terminal device, the first uplink data and the jointly coded data to a network device, wherein the first uplink data is transmitted to the network device separately from the jointly coded data.

2. The method according to claim 1, wherein the transmitting the first uplink data and the jointly coded data to the network device comprises transmitting the first uplink data to the network device on a first transmission resource, and transmitting the jointly coded data to the network device on a second transmission resource different from the first transmission resource.

3. The method according to claim 2, wherein the method further comprises:
   obtaining information about a third transmission resource used by the second terminal device to transmit the second uplink data before the transmitting the first uplink data and before the transmitting the jointly coded data; and
   determining, according to the information about the third transmission resource and the first transmission resource, the second transmission resource used to transmit the jointly coded data.

4. The method according to claim 3, wherein the first transmission resource is a first contention transmission unit (CTU) located in a first contention access region, and the second transmission resource is a second CTU located in a second contention access region different than the first contention access region, and wherein an index number $\text{Indx}_{CTU}$ of the second CTU is determined according to:

$$\text{Indx}_{CTU}=(\text{Sig}_1+\text{Sig}_2)\bmod N_{CTU},$$

wherein $\text{Sig}_1$ is an index of a code resource of the first transmission resource, $\text{Sig}_2$ is an index of a code resource of the third transmission resource, and $N_{CTU}$ is a quantity of CTUs of a current subframe.

5. The method according to claim 4, wherein the code resource of the first transmission resource or the third transmission resource comprises one of a sparse code multiple access codebook, a low density signature sequence, or a Code Division Multiple Access code.

6. The method according to claim 1, wherein the method further comprises receiving first instruction information from the network device before the obtaining the second uplink data of the second terminal device, wherein the first instruction information instructs the first terminal device to perform transmit diversity transmission; and
   wherein the transmitting the first uplink data and the jointly coded data to a network device comprises transmitting the first uplink data and the jointly coded data using transmit diversity transmission with the second terminal device according to the first instruction information.

7. The method according to claim 6, wherein the first instruction information comprises group identifier information of a terminal device group to which the second terminal device belongs and number information of the second terminal device in the terminal device group; and
   wherein the transmitting, by the first terminal device, the first uplink data and the jointly coded data to the network device comprises transmitting, by the first terminal device, the first uplink data and the jointly coded data to the network device using a grant-free transmission.

8. The method according to claim 1, the method further comprises performing, before the obtaining the second uplink data:
   transmitting, by the first terminal device a transmit diversity transmission request to the second terminal device, wherein the transmit diversity transmission request requests that the second terminal device perform transmit diversity transmission with the first terminal device; and
   receiving, by the first terminal device, a transmit diversity transmission response transmitted by the second terminal device in response to the transmit diversity transmission request;
   wherein the transmitting the first uplink data and the jointly coded data to a network device comprises transmitting the first uplink data and the jointly coded data using transmit diversity transmission with the second terminal device in response to the transmit diversity transmission response.

9. The method according to claim 8, wherein the method further comprises:
   transmitting second instruction information to the network device by the first terminal device before the transmitting the first uplink data and the jointly coded data to the network device, wherein the transmitting the first uplink data and the jointly coded data to the network device comprises transmitting the first uplink data and the jointly coded data by the first terminal device using transmit diversity transmission with the second terminal device according to the second instruction information.

10. The method according to claim 1, the method further comprises adding a cyclic redundancy check (CRC) code to the first uplink data before the transmitting the first uplink data and the jointly coded data to the network device, wherein the CRC code is scrambled using an identifier of the second terminal device; and
    wherein the transmitting the first uplink data and the jointly coded data to the network device comprises transmitting the first uplink data with the scrambled CRC code and the jointly coded data using transmit diversity transmission with the second terminal device.

11. An uplink data transmission apparatus, comprising:
    a transmitter;
    a processor; and
    a non-transitory computer-readable storage medium storing a program to be executed by the processor, the program including instructions to:

obtain second uplink data of a second terminal device;
perform joint coding processing on first uplink data of a first terminal device and on the second uplink data, wherein the joint coding processing generates jointly coded data that is based on the first uplink data and the second uplink data; and
cause the transmitter to transmit the first uplink data and the jointly coded data to a network device, wherein the first uplink data is transmitted to the network device separately from the jointly coded data.

12. The uplink data transmission apparatus according to claim 11, wherein the instructions to cause the transmitter to transmit the first uplink data and the jointly coded data to the network device comprise instructions to cause the transmitter to transmit the first uplink data to the network device on a first transmission resource, and transmit the jointly coded data to the network device on a second transmission resource different from the first transmission resource.

13. The uplink data transmission apparatus according to claim 12, wherein the program further includes instructions to:
obtain information about a third transmission resource used by the second terminal device to transmit the second uplink data before the transmitting the first uplink data and before the transmitting the jointly coded data; and
determine, according to the information about the third transmission resource and the first transmission resource, the second transmission resource used to transmit the jointly coded data.

14. The uplink data transmission apparatus according to claim 13, wherein the first transmission resource is a first contention transmission unit (CTU) located in a first contention access region, and the second transmission resource is a second CTU located in a second contention access region different than the first contention access region, and wherein an index number $Indx_{CTU}$ of the second CTU is determined according to:

$$Indx_{CTU}=(Sig_1+Sig_2) \bmod N_{CTU},$$

wherein $Sig_1$ is an index of a code resource of the first transmission resource, $Sig_2$ is an index of a code resource of the third transmission resource, and $N_{CTU}$ is a quantity of CTUs of a current subframe.

15. The uplink data transmission apparatus according to claim 14, wherein the code resource of the first transmission resource or the third transmission resource comprises one of a sparse code multiple access codebook, a low density signature sequence, or a Code Division Multiple Access code.

16. The uplink data transmission apparatus according to claim ii, further comprising a receiver configured to receive first instruction information from the network device before the obtaining the second uplink data of the second terminal device, wherein the first instruction information instructs the first terminal device to perform transmit diversity transmission; and
wherein the instructions to cause the transmitter to transmit the first uplink data and the jointly coded data to a network device comprise instructions to cause the transmitter to transmit the first uplink data and the jointly coded data using transmit diversity transmission with the second terminal device according to the first instruction information.

17. The uplink data transmission apparatus according to claim 16, wherein the first instruction information comprises group identifier information of a terminal device group to which the second terminal device belongs and number information of the second terminal device in the terminal device group; and
wherein the instructions to cause he transmitter to transmit the first uplink data and the jointly coded data to the network device comprise instructions to cause the transmitter to transmit the first uplink data and the jointly coded data to the network device using a grant-free transmission.

18. The uplink data transmission apparatus according to claim ii, the program further includes instructions to, before the obtaining the second uplink data, cause the transmitter to transmit a transmit diversity transmission request to the second terminal device, wherein the transmit diversity transmission request requests that the second terminal device perform transmit diversity transmission with the first terminal device; and
wherein the uplink data transmission apparatus further includes a receiver configured to receive a transmit diversity transmission response transmitted by the second terminal device in response to the transmit diversity transmission request;
wherein the instructions to cause the transmitter to transmit the first uplink data and the jointly coded data to a network device comprise instructions to cause the transmitter to transmit the first uplink data and the jointly coded data using transmit diversity transmission with the second terminal device in response to the transmit diversity transmission response.

19. The uplink data transmission apparatus according to claim 18, wherein the program further includes instructions to:
transmit second instruction information to the network device by the first terminal device before the transmitting the first uplink data and the jointly coded data to the network device, wherein the instructions to transmit the first uplink data and the jointly coded data to the network device comprise instructions to transmit the first uplink data and the jointly coded data by the first terminal device using transmit diversity transmission with the second terminal device according to the second instruction information.

20. The uplink data transmission apparatus according to claim ii, wherein the program further includes instructions to add a cyclic redundancy check (CRC) code to the first uplink data before the transmitting the first uplink data and the jointly coded data to the network device, wherein the CRC code is scrambled using an identifier of the second terminal device; and
wherein the instructions to cause the transmitter to transmit the first uplink data and the jointly coded data to the network device comprise instructions to cause the transmitter to transmit the first uplink data with the scrambled CRC code and the jointly coded data using transmit diversity transmission with the second terminal device.

21. An network device, comprising:
a receiver;
a transmitter;
a processor; and
a non-transitory computer-readable storage medium storing a program to be executed by the processor, the program including instructions to:
cause the transmitter to transmit first instruction information to a first terminal device, wherein the first instruction information instructs the first terminal device to perform transmit diversity transmission with a second terminal device in signal communication with the network device; and receive, through the receiver, first uplink data of the first terminal device and jointly coded data comprising the first uplink data further comprising second uplink data of the second terminal device, wherein the first uplink data and the jointly coded data are sent separately by the first terminal device according to the first instruction information.

\* \* \* \* \*